United States Patent
Yoshida et al.

(10) Patent No.: US 10,104,006 B2
(45) Date of Patent: Oct. 16, 2018

(54) BUS INTERFACE APPARATUS, ROUTER, AND BUS SYSTEM INCLUDING THEM

(71) Applicant: Panasonic Corporation, Osaka (JP)

(72) Inventors: Atsushi Yoshida, Osaka (JP); Satoru Tokutsu, Saitama (JP); Tomoki Ishii, Kyoto (JP); Takao Yamaguchi, Osaka (JP); Yuuki Soga, Kyoto (JP)

(73) Assignee: PANASONIC INTELLECTUAL PROPERTY MANAGEMENT CO. LTD, Osaka (JP)

( * ) Notice: Subject to any disclaimer, the term of this patent is extended or adjusted under 35 U.S.C. 154(b) by 410 days.

(21) Appl. No.: 14/492,181

(22) Filed: Sep. 22, 2014

(65) Prior Publication Data

US 2015/0010005 A1    Jan. 8, 2015

Related U.S. Application Data

(63) Continuation of application No. PCT/JP2013/006823, filed on Nov. 20, 2013.

(30) Foreign Application Priority Data

Jan. 25, 2013    (JP) .................................. 2013-011952

(51) Int. Cl.
*H04L 12/28*    (2006.01)
*H04L 12/863*    (2013.01)
(Continued)

(52) U.S. Cl.
CPC .......... *H04L 47/62* (2013.01); *G06F 13/4059* (2013.01); *H04L 45/74* (2013.01); *Y02D 10/14* (2018.01); *Y02D 10/151* (2018.01)

(58) Field of Classification Search
CPC ................................ H04L 47/62; H04L 12/28
See application file for complete search history.

(56) References Cited

U.S. PATENT DOCUMENTS 5,300,811 A * 4/1994 Suzuki .................. G06F 9/3802
                                                              257/691
6,900,812 B1 * 5/2005 Morein .................. G06T 15/005
                                                              345/531
(Continued)

FOREIGN PATENT DOCUMENTS

JP    2002-290455 A    10/2002
JP    2006-135379 A    5/2006

OTHER PUBLICATIONS

International Search Report for corresponding International Application No. PCT/JP2013/006823 dated Feb. 25, 2014.
(Continued)

*Primary Examiner* — Andrew Lee
(74) *Attorney, Agent, or Firm* — Renner Otto Boisselle and Sklar

(57) ABSTRACT

In the bus system, bus interface apparatuses and routers are connected together through packet exchange buses which have been established on the integrated circuit. The bus interface apparatuses are respectively connected to transmission nodes which transmit data of mutually different numbers of bits in one cycle of operation of the bus system. Each of the bus interface apparatuses generates and transmits a packet based on data received from the transmission node connected and header information including size information indicating the number of bits with respect to the transmission node connected. The router analyzes the packet, gets the size information from the header information, determines how to allocate a space in the buffer for storage by reference to the size information gotten, and stores the received packet in the buffer.

20 Claims, 20 Drawing Sheets

(51) Int. Cl.
*H04L 12/741* (2013.01)
*G06F 13/40* (2006.01)

(56) References Cited

U.S. PATENT DOCUMENTS

| | | | | |
|---|---|---|---|---|
| 2006/0182118 A1* | 8/2006 | Lam | ............... | H04L 12/4641 |
| | | | | 370/395.42 |
| 2006/0215703 A1* | 9/2006 | Honda | ............... | H04L 12/40117 |
| | | | | 370/474 |
| 2007/0070900 A1* | 3/2007 | Heink | ............... | H04L 69/22 |
| | | | | 370/230 |
| 2008/0205432 A1* | 8/2008 | Gangwal | ............... | H04L 45/40 |
| | | | | 370/458 |
| 2009/0080452 A1* | 3/2009 | Ra | ............... | H04L 45/00 |
| | | | | 370/419 |

OTHER PUBLICATIONS

Andreas Gerstlauer, "Automatic Layer-Based Generation of System-On-Chip Bus Communication Models, Computer-Aided Design of Integrated Circuits and Systems", IEEE Transactions on (vol. 26, Issue:9), pp. 1676-1687, IEEE, Sep. 2007.

* cited by examiner

| ITEM | SETTING |
|---|---|
| WIDTH OF BUS CONNECTED TO BUS MASTER | 64 BITS |

| ITEM | SETTING |
|---|---|
| WIDTH OF BUS CONNECTED TO BUS MASTER | 32 BITS |

FLIT RECEIVED     BUFFER     FLIT TRANSMITTED

BUFFER

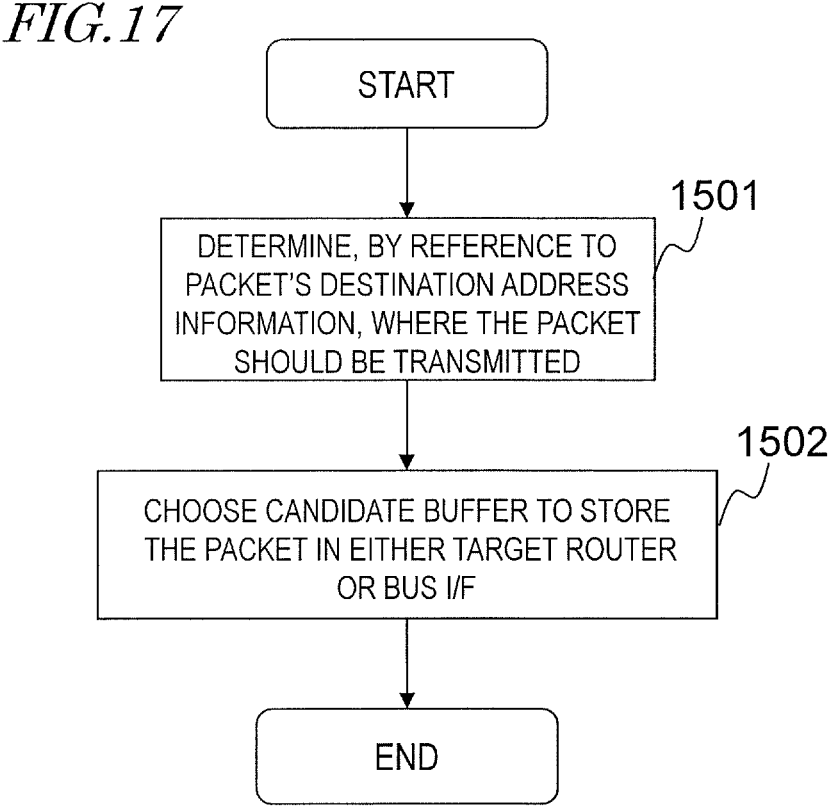

BUS INTERFACE APPARATUS, ROUTER, AND BUS SYSTEM INCLUDING THEM

This is a continuation of International Application No. PCT/JP2013/006823, with an international filing date of Nov. 20, 2013, which claims priority of Japanese Patent Application No. 2013-011952, filed on Jan. 25, 2013, the contents of which are hereby incorporated by reference.

BACKGROUND

1. Technical Field

The present application relates to a technique for using a buffer more efficiently in a router which transfers data to be transmitted and received between a bus master and a slave in a semiconductor integrated circuit including a networked semiconductor bus.

2. Description of the Related Art

In developing an integrated circuit, some people attempt to advance their development more efficiently by recycling and merging together a number of existent bus masters in order to realize the intended function and performance. To make such a development, various kinds of bus masters with mutually different bus widths, bus protocols and required qualities need to be connected together easily.

As a method for getting various kinds of bus masters connected together easily, people have developed a technique which uses a Network on Chip (which will be referred to herein as an "NoC") to connect a plurality of bus masters through a network of buses. In an NoC, data to be transmitted and received by bus masters which use mutually different bus widths and bus protocols is transformed into packets. And each of those packets is delivered to its destination node via a router by the packet exchange method.

According to the packet exchange method, various kinds of data are packetized into packets, which are then transmitted. As a result, those data can be transferred through the same transmission route. However, if the space left in the buffer of the router that should store those packets ran short during the transfer, then the performance of the transmission route would deteriorate, which is a problem.

Not only an NoC but also a transmission route that adopts the packet exchange method should use such a limited buffer space as efficiently as possible without causing a decline in transmission performance.

Japanese Laid-Open Patent Publication No. 2002-290455 (herein referred to as "the JP Patent Publication") discloses an exemplary method for using a buffer of the router more efficiently. Nevertheless, the JP Patent Publication relates to a general network technology which uses IP (Internet Protocol) packets. According to the JP Patent Publication, if a buffer of the router is congested, packets in a class with a low priority level are discarded so that packets in a class with a high priority level can use the buffer preferentially. In this manner, a router's limited buffer space can be used more efficiently.

SUMMARY

Such conventional technologies for using buffers efficiently are designed to be applied to a network in which the flow control is carried out between transmission and reception nodes on the supposition that some packets should be lost on the transmission route as on the Internet. That is to say, the conventional systems have been permitted to discard some packets in order to use the buffer more efficiently.

On the other hand, a network of buses on a semiconductor integrated circuit is designed so that the flow control is carried out between routers on the transmission route and that basically no packets may be lost on the transmission route. That is to say, such a bus system is not permitted in principle to discard packets. That is why just by applying the conventional techniques such as the one disclosed in the JP Patent Publication to the routers, the buffer use efficiency cannot be improved. If the data that has been transmitted from a bus master needs to be discarded on the transmission route, then the functionality of the bus master should be expanded to re-transmit the same data, which means that the existent bus masters cannot be recycled as they are.

To overcome this problem, an aspect of the present invention provides a bus system in which a plurality of bus interface apparatuses and routers are connected together through packet exchange buses which have been established on an integrated circuit. The plurality of bus interface apparatuses are respectively connected to a plurality of transmission nodes which transmit data of mutually different numbers of bits in one cycle of operation of the bus system. Each of the plurality of bus interface apparatuses includes: a reception buffer which stores data that has been received from a transmission node connected to itself; a storage which stores size information indicating the number of bits as to the transmission node connected; a header information generator which generates header information including the size information; a packetizer which generates a packet based on the header information and the data; and a transmission controller which controls transmission of the packet to the router. The router includes: a packet analyzer which analyzes the packet that has been received from the bus interface apparatus and which gets the size information by reference to the header information; a buffer which stores the packet that has been received; a routing controller which determines the target of the packet received; an output controller which controls transmission of the packet from the buffer; and a packet storage controller which determines how to allocate a space in the buffer for storage by reference to the size information gotten.

The router according to an embodiment of the present disclosure recognizes the bus width on the bus master end, which is included as additional information in a packet, and can carry out appropriate addressing automatically by reference to the bus width in order to store a packet in an appropriate buffer and transmit the packet from the buffer. Thus, the buffer can be used more efficiently. As a result, there is no need to make settings for each individual router and the design process of a semiconductor integrated circuit can be simplified.

In addition, as the buffer use efficiency is increased, the throughput of the transmission route can also be increased. As a result, the bus' operating frequency and bus width can be reduced so much as to ensure good performance for a semiconductor integrated circuit, and this configuration would contribute to saving power and cutting down the chip area to use.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 17 shows the procedure in which the routing controller 414 operates.

DETAILED DESCRIPTION

Figure 1:
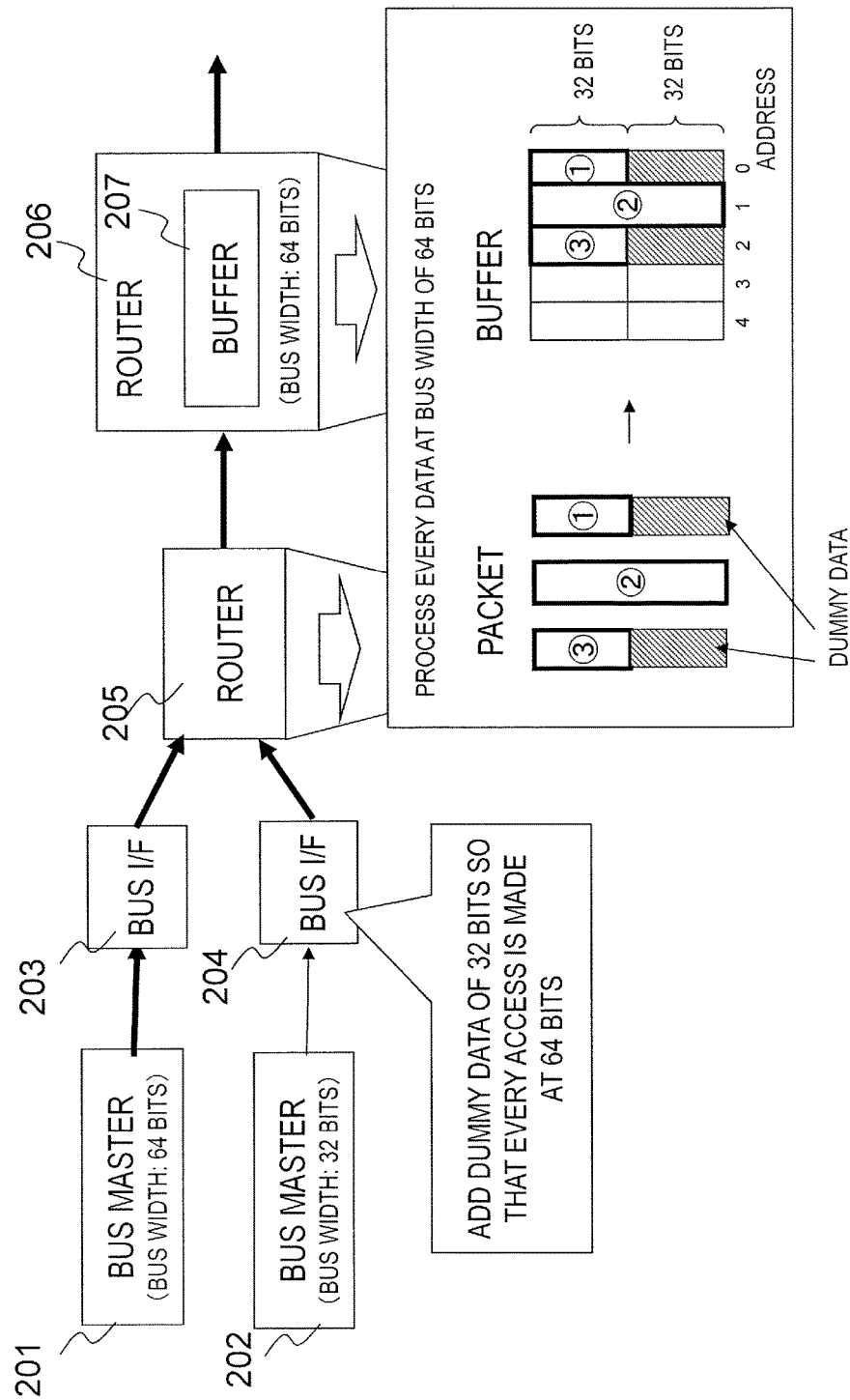
FIG. 1 illustrates how routers provided for a conventional NoC use a buffer.

FIG. 1 illustrates how routers provided for a conventional NoC use a buffer. In the example illustrated in FIG. 1, two bus masters 201 and 202 with mutually different bus widths are connected to a router 205 via bus interface apparatuses (which will be referred to herein as "bus I/Fs") 203 and 204, respectively. The router 205 is connected to another router 206. As will be described later with reference to FIG. 2, these routers 205 and 206 are arranged on the same system bus, which is supposed to have a unified bus width of 64 bits.

According to the present disclosure, a plurality of bus masters which use buses with mutually different widths (i.e., bus widths) for output are supposed to be present on the same NoC. In FIG. 1, the bus width used by the bus master 201 is 64 bits, while the bus width used by the bus master 202 is 32 bits. These routers 205 and 206 are supposed to manage the buffers on a 64 bit basis. This "bus width" refers herein to the number of bits of data to be transmitted in one cycle of operation of the bus system. In this description, information indicating the bus width of a bus master will be sometimes referred to herein as "size information".

As will be described later, when transferred over the NoC, data is packetized. That is why even if the bus master outputs data of 64 bits, the data is never delivered at a time to the router. Instead, the data is divided into a number of groups, to each of which a header and other kinds of information are added, and transferred in the form of packets, each having a size of 64 bits.

The bus I/Fs 203 and 204 are circuits for transforming the data that has been received from the bus masters into packets.

Specifically, the bus I/F 203 packetizes the data that has been received from the bus master 201 with a bus width of 64 bits into data of 64 bits and then transmits the packets to the router 205.

On the other hand, the bus I/F 204 performs processing of adjusting the bus width of the data that has been received from the bus master 202 with a bus width of 32 bits to 64 bits, thereby packetizing the data and transmitting the packets to the router 205. Specifically, in transmitting the data to the router 205 with a bus width of 64 bits, the bus I/F 204 adds dummy data of 32 bits to the data that has been transmitted at the bus width of 32 bits in order to adjust the difference in bus width. In this manner, the bus width of the data can be adjusted to 64 bits. This data of 64 bits is packetized by the bus I/F 204 and the packets thus obtained are transmitted to the router 205 one after another. As a result, the routers 205 and 206 can treat every one of the packets that have been transmitted from those bus masters 201 and 202 with mutually different bus widths as a packet in which data of 64 bits is stored.

Now let's pay attention to a buffer of the router (e.g., the buffer 207 of the router 206). If each of those packets which has been received from the bus I/F 204 and which includes data and dummy data were stored as it is (i.e., as a packet of 64 bits) in the buffer 207, then a part of the buffer would be occupied by the dummy data, which is not used as valid information. That is why the more dummy data is stored in the buffer 207, the less efficiently the buffer 207 can be used.

For instance, in the example illustrated in FIG. 1, Packets #1 and #3 are packets including the data that the bus master 202 has transmitted. Thus, a half of each of these packets is dummy data. On the other hand, Packet #2 is a packet including the data that the bus master 201 has transmitted. In such a situation, approximately one third of the buffer 207 would be occupied by the dummy data, and the buffer 207 could be used much less efficiently.

It should be noted that even if the data has been transmitted at a bus width of 32 bits but if the overall size of the data is large enough, then the bus I/F 204 can combine two sets of data of 32 bits together to form data of 64 bits. By combining the data in this manner, the dummy data can be cut down. However, not every data can be treated in this way. The reason is that data with a small size such as command data may be transmitted. And if data with such a small size has been transmitted, it is still necessary to add dummy data to the data. Consequently, it is impossible to entirely prevent dummy data from occupying the buffer.

Also, if the bus I/F 204 is going to transmit a series of packets, each including command data of 32 bits, consecutively, then those command packets may be combined two by two to form and transmit 64-bit packets one after another. Then the dummy data could be cut down. To combine multiple commands together and transmit the combined commands, however, the decision needs to be made whether those commands should be transmitted in a combined form or on a one-by-one basis with dummy data added depending on whether the bus master 202 is going to transmit those commands consecutively or on a one-at-a-time basis. That is why the functionality needs to be expanded so that the bus master 202 can notify the bus I/F 204 of the number of commands to be transmitted and their transmission interval.

Furthermore, to allow the bus I/F 204 to combine the packets, a buffer to temporarily hold the data and a dedicated circuit need to be provided for the bus I/F 204. And if such a special measure is taken for each bus master or bus I/F, a system in which various kinds of bus masters need to be connected together cannot be developed easily.

In any modified example in which data is combined, if data need to be transmitted to a router on an NoC which uses a bus width of 64 bits, the bus I/F should always transfer a packet including data of 64 bits.

An aspect of the present invention can be outlined as follows.

In a bus system according to an aspect of the present invention, a plurality of bus interface apparatuses and routers are connected together through packet exchange buses which have been established on an integrated circuit. The plurality of bus interface apparatuses are respectively connected to a plurality of transmission nodes which transmit data of mutually different numbers of bits in one cycle of operation of the bus system. Each of the plurality of bus interface apparatuses comprises: a reception buffer which stores data that has been received from a transmission node connected to itself; a storage which stores size information indicating the number of bits as to the transmission node connected; a header information generator which generates header information including the size information; a packetizer which generates a packet based on the header information and the data; and a transmission controller which controls transmission of the packet to the router. The router includes: a packet analyzer which analyzes the packet that has been received from the bus interface apparatus and which gets the size information by reference to the header information; a buffer which stores the packet that has been received; a routing controller which determines the target of the packet received; an output controller which controls transmission of the packet from the buffer; and a packet storage controller which determines how to allocate a space in the buffer for storage by reference to the size information gotten.

In one embodiment, the packet storage controller of the router allocates an address in the buffer to the packet using the number of bits indicated by the size information as a unit, and the buffer stores the received packet at the address that has been allocated by the packet storage controller.

In another embodiment, the plurality of transmission nodes include a first transmission node which transmits data at a first number of bits and a second transmission node which transmits data at a second number of bits that is smaller than the first number of bits. And if the data is transmitted through the bus at a third number of bits that is equal to or greater than the first and second numbers of bits, the transmission controller of the bus interface apparatus that is connected to the second transmission node transmits the packet to the router at the third number of bits including the data at the second number of bits, the packet storage controller of the router allocate the address in the buffer by using, as a unit, the second number of bits indicated by the size information, and the buffer of the router stores the packet at the second number of bits.

In another embodiment, the packet storage controller of the router further controls the size of the packet to be transmitted from the buffer by reference to the size information gotten.

In another embodiment, the size information is changeable. And if the size information indicating the number of bits has changed with respect to a predetermined transmission node, the header information generator of the bus interface apparatus that is connected to the predetermined transmission node changes the size information included in the header information.

In another embodiment, the predetermined transmission node has multiple modes of operation in which power is consumed to mutually different degrees, and the size information indicating the number of bits changes in response to a change of the modes of operation.

In another embodiment, the predetermined transmission node is switchable from a data transfer mode in which data is transferred at a first number of bits into a data transfer mode in which data is transferred at a second number of bits that is smaller than a first bus width, and vice versa. The size information indicating the number of bits changes in response to a switch of the data transfer modes.

In another embodiment, the bus interface apparatus further includes a quality controller which determines the quality required for the transmission node connected. The header information generator of the bus interface apparatus generates header information further including information about the required quality. The packet analyzer of the router gets the size information and the information about the required quality that have been written on the header information in the packet received. And the packet storage controller of the router determines how to allocate a space in the buffer for storage by reference to the size information and the required quality.

In another embodiment, the quality controller gets information indicating the quality required for the transmission node connected from that transmission node. If the required quality indicates that there is no constraint on time delay, the packet storage controller of the router determines, on a packet-by-packet basis, how to allocate a space in the buffer for storage by reference to the size information included in the header information.

In another embodiment, the quality controller gets information indicating the quality required for the transmission node connected from that transmission node. If the required quality indicates that a constraint on time delay is stricter than a predetermined level, the packet storage controller of the router determines how to allocate a space in the buffer for storage and how to access the space for transmission based on a predetermined constant number of bits.

In another embodiment, the constraint on the time delay is represented by at least one of a class indicating how strictly the required quality is to be controlled and a deadline time that is a maximum permissible time delay to ensure the required quality.

In another embodiment, the header information generator of the bus interface apparatus generates the header information as router information to be used by the router and bus interface information to be used by the bus interface apparatus in this order.

In another embodiment, the routing controller of the router chooses a buffer to be used in another apparatus, which is the target of the packet, to store the received packet by reference to the size information that has been gotten by the packet analyzer and the availability of a buffer in that another apparatus.

In another embodiment, the availability of a buffer in that another apparatus which is the target of the packet is at least one of how a flit is stored in the buffer, the number of bits of the flit stored, and the space left in the buffer.

A bus interface apparatus according to another aspect of the present invention is designed to be used in a bus system which includes: a packet exchange bus which has been established on an integrated circuit; a transmission node which transmits data through the bus; and a router which is provided on the bus to relay the data being transferred. The apparatus includes: a reception buffer which is connected to the transmission node and which stores data that has been received from the transmission node; a storage which stores size information indicating the number of bits as to the transmission node; a header information generator which generates header information including the size information; a packetizer which generates a packet based on the header information and the data; and a transmission controller which controls transmission of the packet to the router.

In one embodiment, if the bus and the router transmit data at a first number of bits in one cycle of operation and if the transmission node transmits data at a second number of bits that is different from the first number of bits, the header information generator generates header information including size information indicating the second number of bits which is used to determine how to allocate a space in the buffer for storage to the packet that has been received by the router.

A router according to still another aspect of the present invention is designed to be used in a bus system. The bus system includes: a packet exchange bus which has been established on an integrated circuit; a transmission node which transmits data through the bus; and a bus interface apparatus which connects the transmission node and the bus together. The bus interface apparatus generates a packet based on the data that has been received from the transmission node and header information including size information indicating the number of bits as to the transmission node and outputs the packet. The router includes: a packet analyzer which analyzes the packet that has been received from the bus interface apparatus and which gets the size information by reference to the header information; a buffer which stores the packet that has been received; a routing controller which determines the target of the packet received; an output controller which controls transmission of the packet from the buffer; and a packet storage controller which determines how to allocate a space in the buffer for storage by reference to the size information gotten.

Hereinafter, embodiments of a communications system, router, and interface apparatus according to the present disclosure will be described with reference to the accompanying drawings.

Before embodiments of the present disclosure are described, a semiconductor integrated circuit to which the present disclosure is applied will be described.

Figure 2:
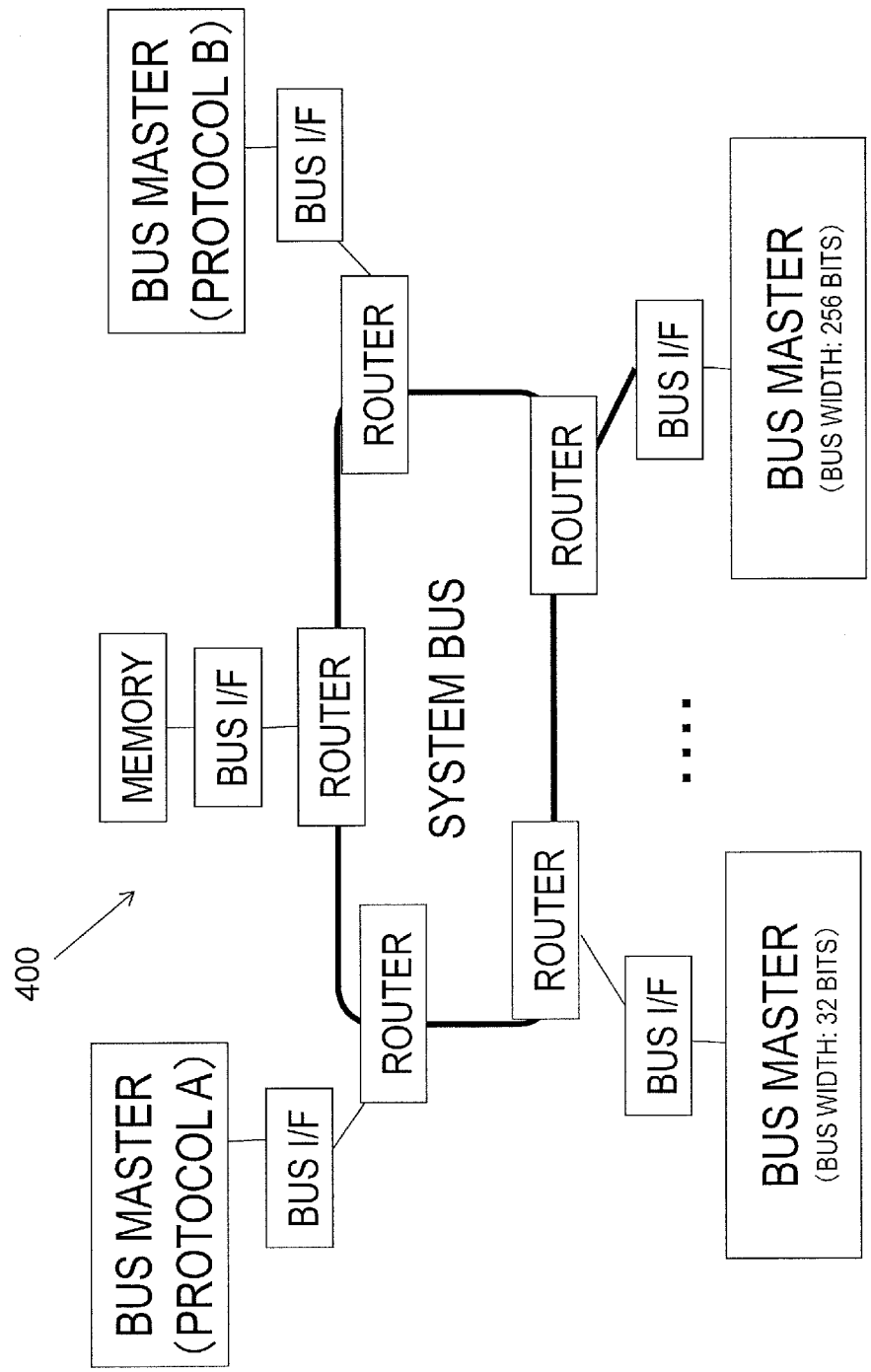
FIG. 2 illustrates an exemplary configuration for a semiconductor integrated circuit in which a bus system 400 according to an exemplary embodiment has been established.

FIG. 2 illustrates an exemplary configuration for a semiconductor integrated circuit in which a bus system 400 according to this embodiment has been established.

This embodiment is supposed to be applied to a semiconductor integrated circuit in which a bus system has been established by connecting together multiple bus masters that use mutually different bus widths in making accesses (input and output) and that comply with mutually different communication protocols. Each bus master is connected to a shared memory through a networked system bus including bus I/Fs and routers. Each of those bus I/Fs is a circuit for transforming data that has been received from an associated bus master into a packet or extracting data from a packet. Each of those routers is a circuit for transferring packetized data to a destination node.

In the exemplary configuration shown in FIG. 2, multiple routers are circularly connected. However, the semiconductor integrated circuit to which this embodiment is applied does not have to have such a ringlike connection. Rather, the present disclosure is also applicable to a mesh-type architecture in which routers are arranged to form a grid and a hierarchical architecture in which routers are connected together in multiple stages. Also, although multiple bus masters are supposed to be connected to a single shared memory in FIG. 2, the number of shared memories to provide does not have to be one but multiple shared memories may be provided as well. Still alternatively, the bus masters may be connected to not only memories but also I/O (input/output) to an external circuit as well.

Figure 3:
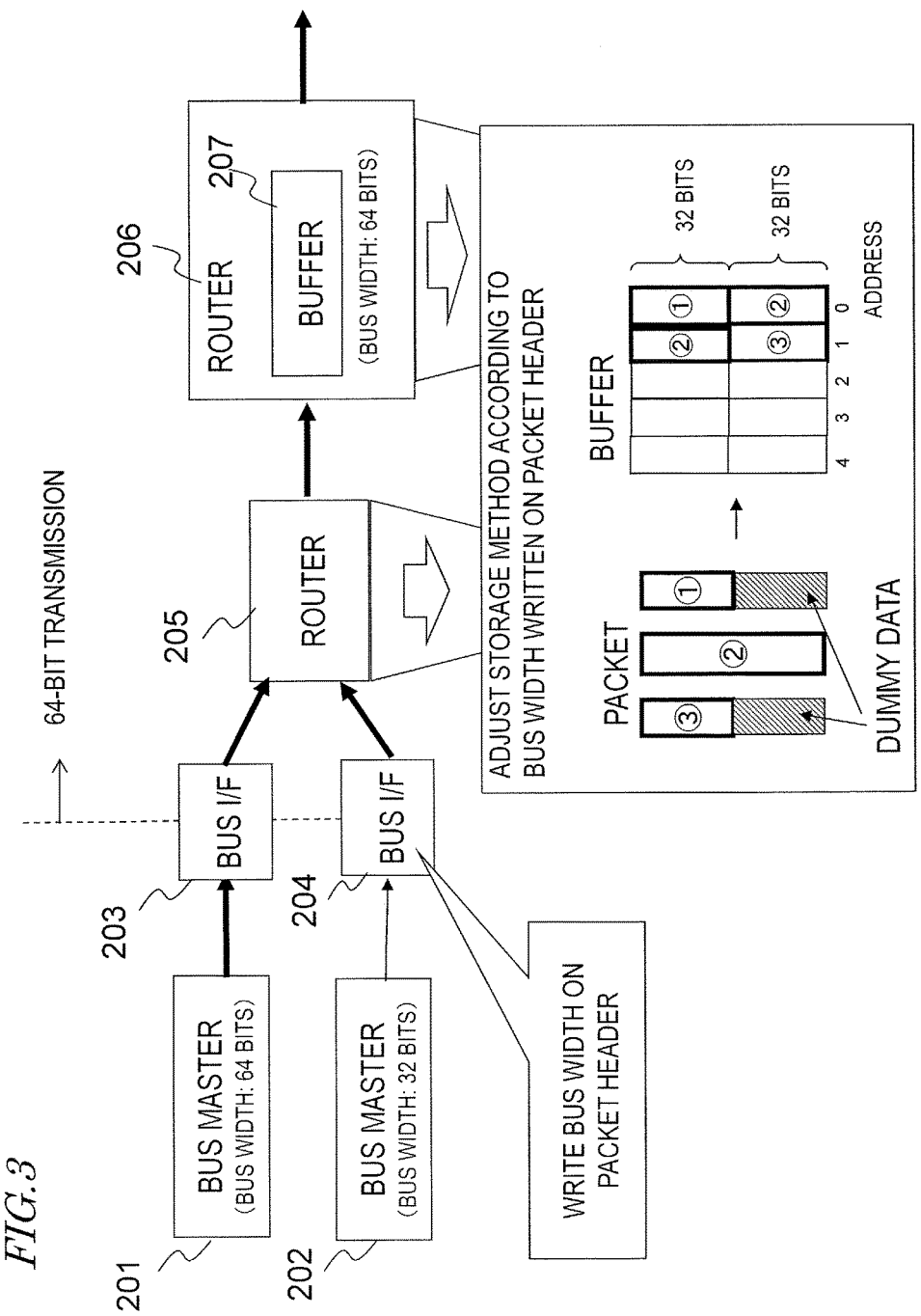
FIG. 3 illustrates generally how a bus system according to an exemplary embodiment operates.

FIG. 3 illustrates generally how the bus system of this embodiment operates.

According to this embodiment, when a bus I/F transforms data which has been received from a bus master into a packet, the bus I/F writes the bus master's bus width value in the header of the packet. By reading the bus width value that has been written in the packet header, the routers 205 and 206 can detect the values of actual data and dummy data that are included in the packet.

In this description, the "dummy data" refers herein to data to be inevitably transmitted along with data of 32 bits which is actually transmitted when the data of 32 bits is being transmitted through a bus with a unified bus width of 64 bits (e.g., the system bus shown in FIG. 2). Since the bus is driven at a width of 64 bits, not only the 32 bits to be actually transmitted but also the other 32 bits are transmitted as some kind of data. This dummy data has a null value and may be data which is a string of a single predetermined value such as zeroes or ones.

Meanwhile, the routers 205 and 206 store only the actual data included in the packet in the buffer 207 by reference to the bus width value that has been written on the header of the packets received.

For instance, in the example illustrated in FIG. 3, as for Packets #1 and #3 which have been received from the bus master 202 with a bus width of 32 bits, only the actual data is stored in the buffer with the dummy data removed. On the other hand, the first half of Packet #2 which has been received from the bus master 201 with a bus width of 64 bits is stored in the space of 32 bits that has been created by removing the dummy data from Packet #1. As a result, compared to the example shown in FIG. 1, the space to be used in the buffer 207 can be cut down to approximately two thirds, and the buffer can be used more efficiently, according to this embodiment.

Furthermore, in the example illustrated in FIG. 3, since the packets are sequentially stored in the order of arrival from Address #0 of the buffer with no space left for nothing, the first 32 bits of Packet #2 is stored at Address #0 and the other 32 bits thereof is stored at Address #1 separately. In that case, to store or retrieve Packet #2, accesses need to be made twice to Address #0 and then to Address #1, thus causing a longer time delay. Thus, to make every packet accessible at a time, Packet #2 with a bus width of 64 bits may be stored entirely at Address #1 and Packets #1 and #3, each having a bus width of 32 bits, may be stored at Address #0.

In this manner, according to the present disclosure, the router automatically changes, by reference to the bus width when the source bus master accesses the bus I/F which is written in the header of a packet received, how to store the packet in the buffer 207.

Hereinafter, embodiments of the present disclosure will be described more specifically with reference to the accompanying drawings.

Figure 4:
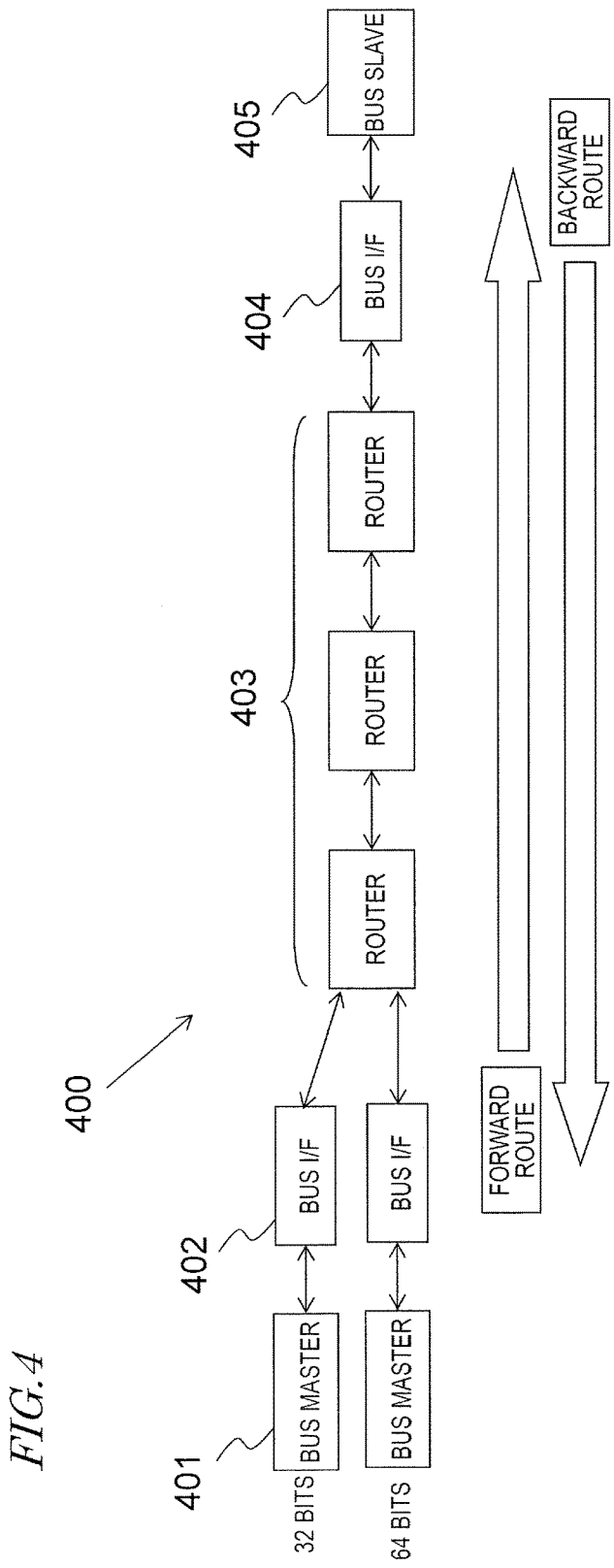
FIG. 4 illustrates specifically how the bus system 400 of this embodiment may be connected.

FIG. 4 illustrates specifically how the bus system 400 of this embodiment may be connected. As shown in FIG. 4, a bus master 401, a bus I/F 402, (a group of) routers 403, another bus I/F 404, and a bus slave 405 are connected together in this order.

The bus I/F 402 and routers 403 of the present disclosure are supposed to use a Network on Chip which connects together a plurality of bus masters 401 and a plurality of bus slaves 405 with mutually different bus widths.

Optionally, as bus masters 401 to be incorporated into this bus system 400, existent processors such as a DSP to process various kinds of media and a CPU to transfer a file at high speeds may be used. Also, as bus slaves 405, a shared memory and a common IO (input/output) may be used. In this case, the bus I/Fs 402 and 404 may be operated adaptively to those existent processors.

In the following description, a route through which data that has been transmitted from the bus master 401 passes before reaching the bus slave 405 will be referred to herein as a "forward route", and a route through which data that has been transmitted from the slave passes before reaching the bus master will be referred to herein as a "backward route". On the forward route, the bus master 401 becomes a transmission node which transmits the data. The bus I/F 402 is a circuit which connects the bus master 401 and the routers 403 together and which transforms the data that the bus master 401 has transmitted into a packet which can be received by the routers 403. Meanwhile, the bus I/F 404 is a circuit which connects the routers 403 and the bus slave 405 together. The bus I/F 404 receives the packet that the routers 403 have transmitted, transforms the packet into data which can be received by the bus slave 405, and then transmits the data to the bus slave 405.

On the backward route, the bus slave 405 becomes a transmission node which transmits the data. The bus I/F 404 receives the data that the bus slave 405 has transmitted, transforms the data into a packet which can be received by the routers 403, and then transmits the packet to the routers 403. Meanwhile, the bus I/F 402 receives the packet from the routers 403, transforms the packet into data which can be received by the bus master 401, and then transmits the data to the bus master 401.

In the following description, it will be described how this bus system 400 operates on the forward route on which the bus master 401 becomes a transmission node.

Figure 5:
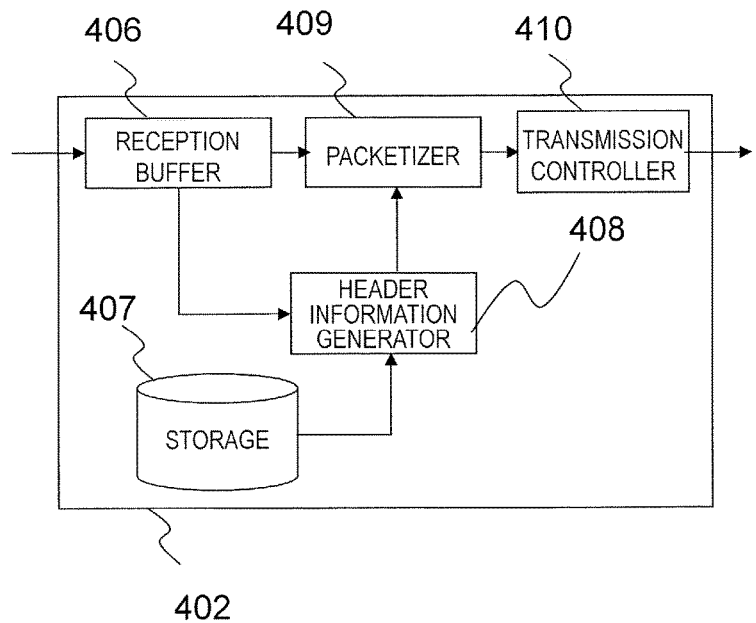
FIG. 5 illustrates a configuration for a bus I/F 402.

FIG. 5 illustrates a configuration for the bus I/F 402.

The bus I/F 402 includes a reception buffer 406, a storage 407, a header information generator 408, a packetizer 409 and a transmission controller 410.

The reception buffer 406 is a memory which temporarily stores the destination address, control signal, and data which the bus master 401 has transmitted.

The storage 407 is a memory which stores the bus width to be used by the bus master 401 in transmitting the data.

The header information generator 408 is a circuit which generates header information to be added to the packet based on the destination address provided by the bus master 401, the contents of the control signal, and the bus width information that is stored in the storage 407.

The packetizer 409 is a circuit which packetizes the data by adding the packet header that has been generated by the header information generator 408 to the data that is stored in the reception buffer 406.

The transmission controller 410 is a circuit which divides the packet that has been generated by the packetizer 408 into a number of flits (each of which is a data unit that can be sent in one cycle) and which transmits the data to the router 403 one flit after another.

Figure 6:
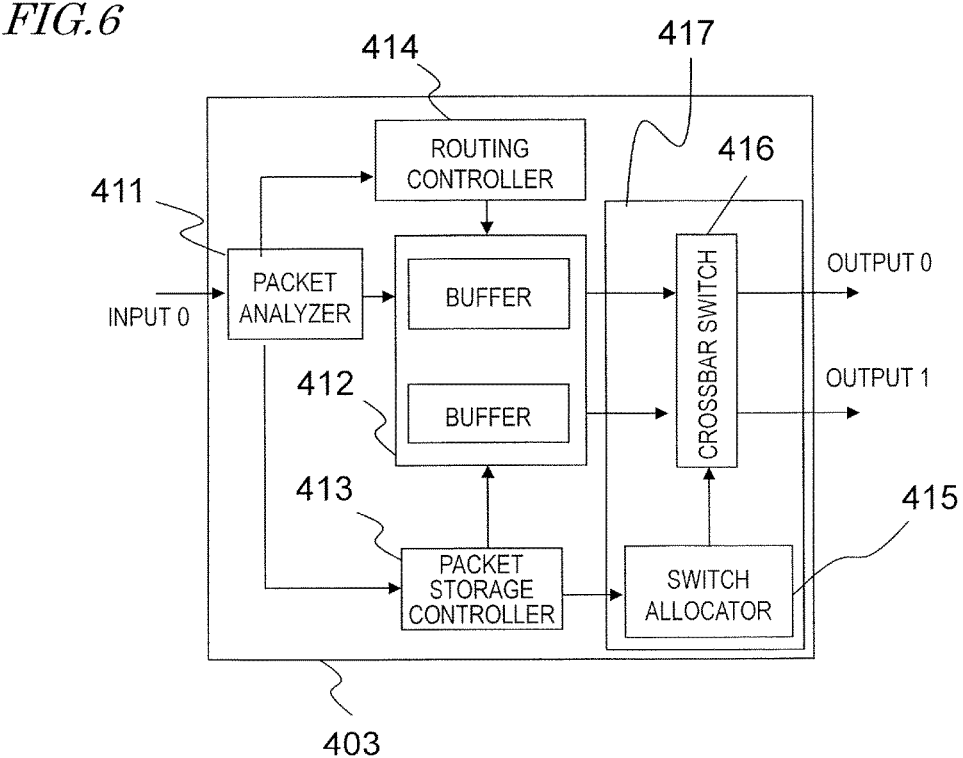
FIG. 6 illustrates a configuration for a router 403.

FIG. 6 illustrates a configuration for the router 403.

The router 403 is a device which delivers the packet that has been received from the bus I/F 402 to the bus slave 405 that is its destination. The router 403 includes a packet analyzer 411, buffers 412, a buffer storage controller 413, and an output controller 417.

The packet analyzer 411 is a circuit which obtains the destination address and bus width value of the packet by reference to the header information of the packet received.

The buffers 412 are memories which temporarily store the packet.

The packet storage controller 413 is a circuit which carries out addressing by reference to the bus width information that the packet analyzer 411 has gotten in order to store the flit in the buffer 412 and to transmit the flit from the buffer 412. In this description, "addressing" to be carried out during storage processing refers herein to processing of allocating a storage space in a buffer, for example, to the data to be stored. On the other hand, "addressing" to be carried out during transmission processing refers herein to processing of determining what location in the storage space should be accessed to retrieve data to be transmitted to the target (destination) from it.

A routing controller 414 is a circuit which determines, by reference to the destination address of the packet, what buffer will store the packet that the router 403 is going to transmit in the router at the target.

The output controller 417 controls transmission of the packets from the buffers. The output controller 417 includes a switch allocator 415 and a crossbar switch 416.

The crossbar switch 416 is a switching circuit which changes connection between a plurality of buffers and the outputs of the router 403.

The switch allocator 415 is a circuit which changes connection of the crossbar switch 416.

The bus I/F 404 connected to the bus slave is a circuit which connects the router 403 and the bus slave 405 together and which transforms the packet that has been received from the router 403 into data that can be received by the bus slave 405.

Figure 7:
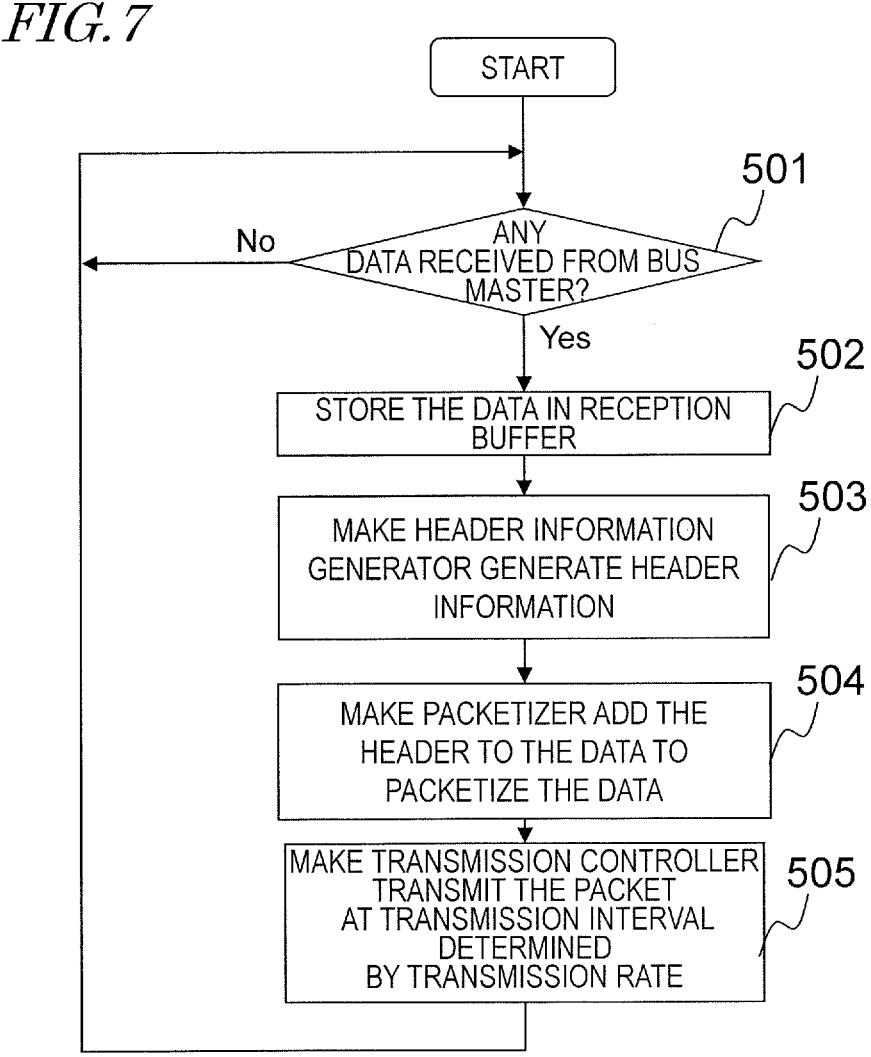
FIG. 7 is a flowchart showing in what procedure the bus I/F 402 operates.

FIG. 7 shows in what procedure the bus I/F 402 operates.

The bus I/F 402 performs the following processing steps in order to transform the data that has been received from the bus master 401 into a packet including a value representing the width of the bus between the bus master 401 and the bus I/F 402 and then transmit the packet to the router 403.

First, in Step 501, the bus I/F 402 determines whether or not the bus I/F 402 has received any data from the bus master 401. If the answer is YES, the process advances to Step 502. Otherwise, this processing step 501 is performed all over again.

If the bus I/F 402 has received any data from the bus master 401, the bus I/F 402 stores, in Step 502, the data that has been received from the bus master 401 in the reception buffer 406.

Next, when the data is stored in the reception buffer 406, the header information generator 408 generates, in Step 503, header information including the bus width value of the data that the bus master 401 has transmitted. It will be described in detail later with reference to FIG. 11 exactly how the header information generator 408 operates.

Subsequently, in Step 504, the packetizer 409 adds the header information that has been generated by the header information generator 408 to the data that the bus master 401 has transmitted, thereby making a packet.

Thereafter, in Step 505, the transmission controller 410 transmits the packets that have been generated by the packetizer 409 at a transmission interval which is determined based on a predetermined transmission rate.

By performing these processing steps 501 to 505 in this manner, the bus I/F 402 transforms the data that has been received from the bus master 401 into a packet including a value representing the width of the bus between the bus master 401 and the bus I/F 402 and then transmits the packet to the router 403.

Figures 8, 9A, 9B:
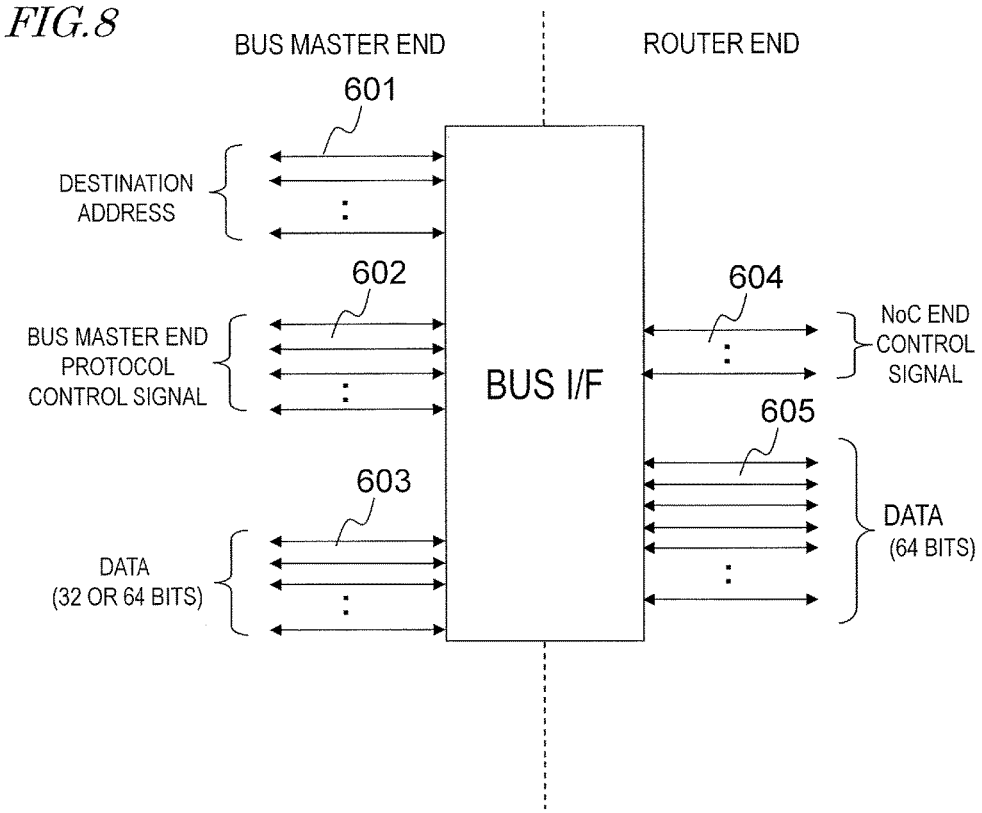
FIG. 8 illustrates an exemplary arrangement of input and output signal lines for the bus I/F 402.
FIG. 9A shows exemplary contents of data to be stored in a storage 407.
FIG. 9B shows exemplary contents of data to be stored in the storage 407.

FIG. 8 illustrates an exemplary arrangement of input and output signal lines for the bus I/F 402.

The bus master 401 and the bus I/F 402 are connected together with signal lines 601 through which the bus I/F 402 is notified of the destination address of the data, signal lines 602 through which the bus protocol of the bus master 401 is controlled, and signal lines 603 through which actual data is transmitted.

On the other hand, the bus I/F 402 and the router 403 are connected together with signal lines 604 through which devices on the NoC end are controlled and signal lines 605 through which the packetized data is transmitted.

As can be seen, the signal lines that connect the bus I/F 402 to the bus master 401 are different from the signal lines that connect the bus I/F 402 to the router 403. The bus width of the signal lines connected to the router 403 has been determined in advance. Thus, the bus I/F 402 transmits data with a predetermined data width (or size). It should be noted that even if the data width has been determined in advance in this manner, not every data flowing through the signal lines is required. Optionally, effective data which forms only a part of the data (e.g., only 32 bits out of the bus width of 64 bits) may be transmitted, for example. As described above, the data to be transmitted includes not only mere commands but also data to be stored in the memory. Thus, depending on the contents of the data to be transmitted, the size of the data flowing through the signal lines may change.

FIGS. 9A and 9B show exemplary contents of the data to be stored in the storage 407. In this example, the storage 407 stores the bus width value of the data lines between the bus master 401 and the bus I/F 402.

In the example shown in FIG. 9A, a bus with a bus width of 64 bits is defined in the storage 407 as a bus to connect the bus master 401 and the bus I/F 402 together. The bus width value has been set in advance for each bus I/F 402. On the other hand, in the example shown in FIG. 9B, a bus with a bus width of 32 bits has been selected for the storage 407.

The bus width value to be stored in the storage 407 does not have to be defined in advance. Instead, while the bus master 401 is transmitting data, the bus width value may be transmitted as a part of the control signal from the bus master 401 to the bus I/F 402. Alternatively, the bus I/F 402 may detect which of the data lines that are connected to the bus master 401 the signal has been actually transmitted through and may get the bandwidth of the data line as the bus width value.

Figure 10:
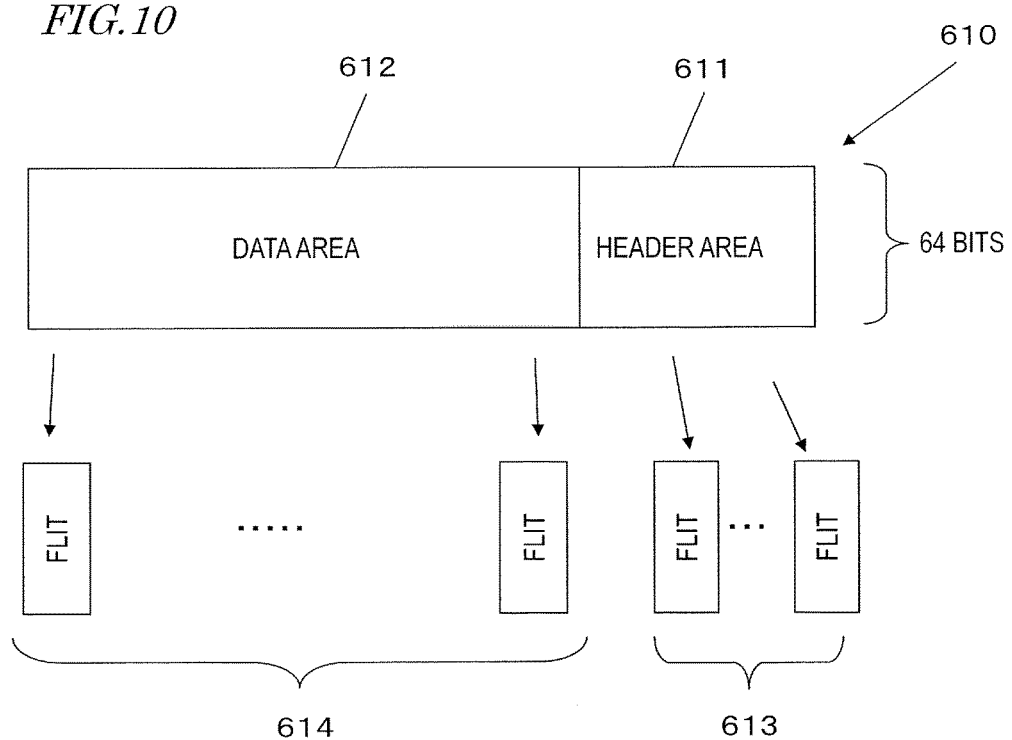
FIG. 10 illustrates an exemplary format for a packet 610 to be generated by a packetizer.

FIG. 10 illustrates an exemplary format for a packet 610 to be generated by the packetizer. The format of the packet 610 shown in FIG. 10 is adopted when the packet 610 is transmitted through a bus with a bus width of 64 bits. In this case, the packet 610 is divided into a header area 611 and a data area 612.

The header area 611 is provided at the top of the packet and stores the header information to be described later with reference to FIG. 12. That header information is generated by the header information generator 408.

On the other hand, the data area 612 stores the data that the bus master 401 has transmitted.

It should be noted that in this bus system 400 for a semiconductor integrated circuit, packets are transmitted on the basis of a flit, which is obtained by subdividing a single packet into smaller units. In this case, a "flit" refers herein to an amount of data which can be transmitted through the bus in one cycle of a clock signal on which this bus system 400 operates. Those flits can be classified into one or more header flits 613 including the header information that is stored in the packet and one or more data flits including the data that is stored in the packet. The processing of subdividing a packet into flits is carried out by the transmission controller 410.

Although a packet including both the header area 611 and the data area 612 is shown in FIG. 10, a packet 610 may consist of the header area 611 alone. For example, if a bus master submits a read request with respect to a memory, only a control signal including no data may be stored in the header area and transmitted.

Hereinafter, it will be described how the header information generator 408 generates header information to be stored in the header area of a packet.

Figure 11:
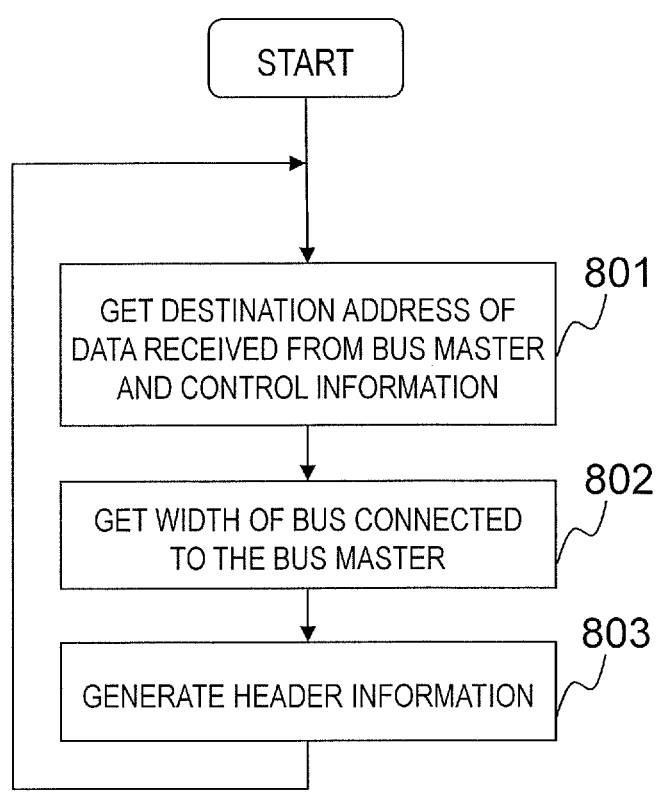
FIG. 11 is a flowchart showing in what procedure a header information generator 408 operates.

FIG. 11 shows in what procedure the header information generator 408 operates.

The header information generator 408 generates header information based on the signal provided by the bus master 401 and information about the bus width which is stored in the storage 407. In this case, the "signal provided by the bus master 401" is a signal which is transmitted through the signal lines 601 shown in FIG. 8 and which indicates the destination address of the data. Specific processing steps to be carried out by the header information generator 408 are Steps 801 to 803 to be described below. And the data structure of the header information that has been generated by the header information generator 408 is shown in FIG. 12 to be referred to later. First of all, the processing of generating the header information will be described with reference to FIG. 11.

FIG. 11 is a flowchart showing in what procedure the header information generator 408 operates.

First of all, in Step 801, the header information generator 408 gets the destination address information which has been received from the bus master 401 through the signal lines

601. In addition, if necessary, the header information generator 408 also gets control information of the bus protocol used by the bus master which is transmitted through the signal lines 602.

Next, in Step 802, the header information generator 408 gets the bus width value from the storage 407.

Then, in Step 803, the header information generator 408 generates a packet header including the destination address, bus protocol control information and bus width value that have been gotten.

By performing these processing steps 801 to 803 in this manner, the header information generator 408 generates header information including information about the bus width.

It should be noted that the bus width value included in the header information may be not only an actual bus width value that has been written down directly but also any other kind of information which allows the router 403 to find the value of the bus width that has been actually used. For example, the kind of the bus width to be used may be defined in advance between the bus I/F 402 and the router 403 and a piece of information indicating that type may be written as a part of the header information.

For instance, a table of correspondence between an identifier of the bus master 401 and a bus width value may be stored in advance in each of the bus I/F 402 and the router 403, and the bus master's identifier may be written as a part of the header information instead of the bus width value.

Alternatively, the header information generator 408 does not have to get the information about the bus width from the bus master 401 every time a communication is opened up. For example, if the bus width of the bus used by the bus master 401 does not change, then information about that bus width may be stored in the storage 407 and the header information generator 408 may refer to that information once when the operation is started.

Figure 12:
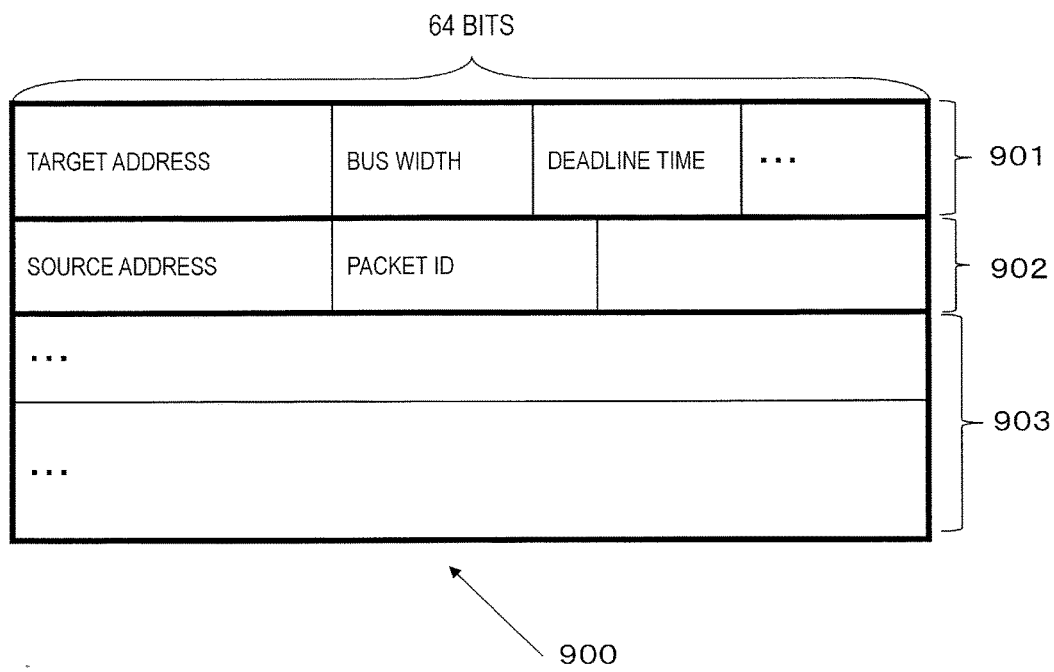
FIG. 12 shows exemplary pieces of information that are written in the packet header.

FIG. 12 shows exemplary pieces of information that are written in the packet header.

The pieces of information to be written in the packet header are roughly classified into the following three groups.

One of the three is router information 901 for use to control the router 403. The destination address information and bus width value are pieces of information that the router 403 needs and are written as parts of the router information.

Another one is bus I/F information 902 to be used by the bus I/F 404 on the bus slave (405) end. As parts of the bus I/F information, written are the source address which is needed to make a response packet from the bus slave 405 and a packet ID which is used to determine the correspondence between a request packet (i.e., the packet that has been transmitted) and the response packet.

And the other one is bus protocol information 903 which has been written as pieces of unique information such as AXI (Advanced eXtensible Interface) and OPC (Open Core Protocol).

The header information is written following the order of the devices that the packet passes through on the transmission route, i.e., the router information to be used by the router, the bus I/F information to be used by the bus I/F 404, and the bus protocol information to be used by the bus master 401 and the bus slave 405 in this order.

By forming the header information of these pieces of information that are arranged in this order, the time it takes for the router 403 or the bus I/F 404 to retrieve their necessary pieces of information from the header information can be shortened and the processing can get done more speedily.

Figure 13:
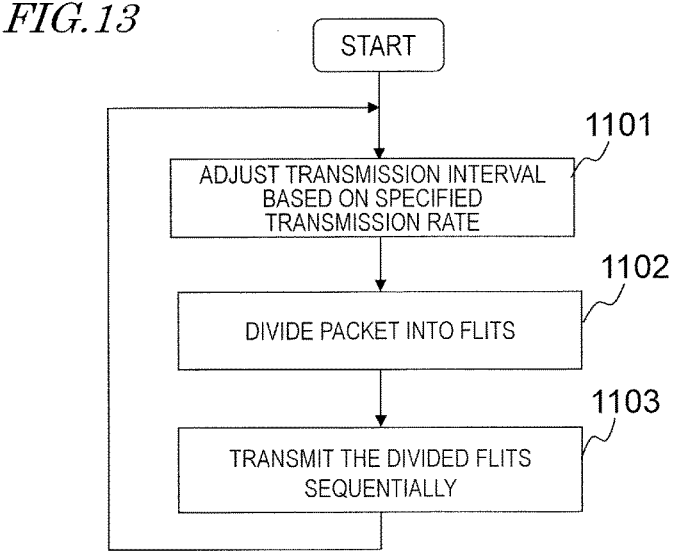
FIG. 13 shows the procedure in which a transmission controller 410 operates.

FIG. 13 shows the procedure in which the transmission controller 410 operates.

In order to transmit the packet that has been generated by the packetizer 409 to the router 403, the transmission controller 410 performs the following processing steps.

First of all, in Step 1101, the transmission controller 410 adjusts the packet transmission interval based on a predefined transmission rate.

Next, in Step 1102, the transmission controller 410 divides the packet that has been generated by the packetizer 409 into flits.

And then in Step 1103, the transmission controller 410 transmits those divided flits sequentially from the header flit and on.

By performing this series of processing steps 1101 to 1103 a number of times, the bus I/F 402 transmits the packets to the router 403 one after another at a predetermined transmission rate.

Next, it will be described how the router 403 processes the packets that the bus I/F 402 has output in this manner.

Figure 14:
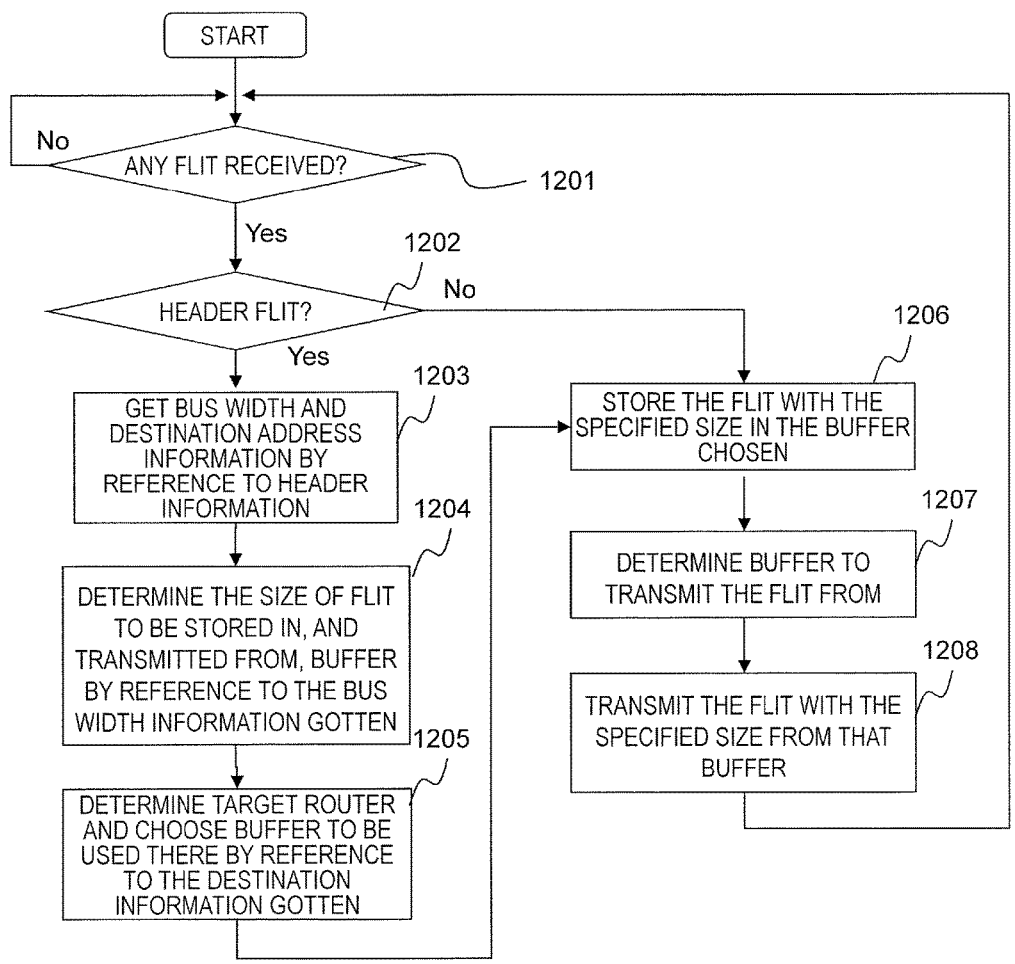
FIG. 14 shows the procedure in which the router 403 operates.

FIG. 14 shows the procedure in which the router 403 operates.

The router 403 receives, on a flit-by-flit basis, the packet that the bus I/F 402 has output. At this time, the router 403 performs the processing to increase the buffer use efficiency based on the bus width value that is written in the packet received.

First, in Step 1201, the packet analyzer 411 determines whether or not there are any flits that have been received. If no flits have been received, then this processing step 1201 is performed over and over again until any flit is received. On the other hand, if any flit has been received, then the process advances to Step 1202.

In Step 1202, the packet analyzer 411 determines whether or not the flit received is a header flit. This decision may be made by adding an identifier indicating the type of a flit to each flit and by seeing if there is any identifier indicating the identity as a header flit. Or the decision may also be made by determining whether or not the header flit includes a part of the data structure shown in FIG. 12. For example, even if there are multiple header flits, the router information 901 shown in FIG. 12 should be stored in the first one of the header flits. Thus, the packet analyzer 411 can determine whether the flit received is a header flit or not by seeing if the flit stores the router information 901. If the answer is YES, the process advances to Step 1203. Otherwise, the process advances to Step 1206.

In Step 1203, the packet analyzer 411 gets the bus width value and the destination address information by reference to the header information that has been written on the header flit.

Next, in Step 1204, the packet storage controller 413 carries out addressing by reference to the bus width information that the packet analyzer 411 has gotten in order to store the received flit in a buffer and to transmit the flit from the buffer. The operation of the packet storage controller 413 will be described in further detail later with reference to FIGS. 15 and 16.

Subsequently, in Step 1205, the routing controller 414 determines, by reference to the destination address information that the packet analyzer 411 has gotten, what the target router 403 is, and further chooses the router's (403) buffer 412 that should store that packet. The operation of the routing controller 414 will be described in further detail later with reference to FIG. 17.

In Step 1206, the packet storage controller 413 stores the flit in the buffer in accordance with the result of addressing that has been carried out in Step 1204.

Next, in Step 1207, the switch allocator 415 chooses a buffer to transmit the flit from for each output of the router 403.

Then, in Step 1208, the switch allocator 415 turns the crossbar switch 416, and transmits the flit from the buffer 412 in accordance with the result of addressing that has been carried out in Step 1204.

By performing these processing steps 1201 through 1208 in this manner, the router 403 stores the packet based on the bus width value that has been written on the packet received so as to use the buffer 412 as efficiently as possible. By making each and every router operate in the same way, the packet can be delivered to its destination node.

Figure 15:
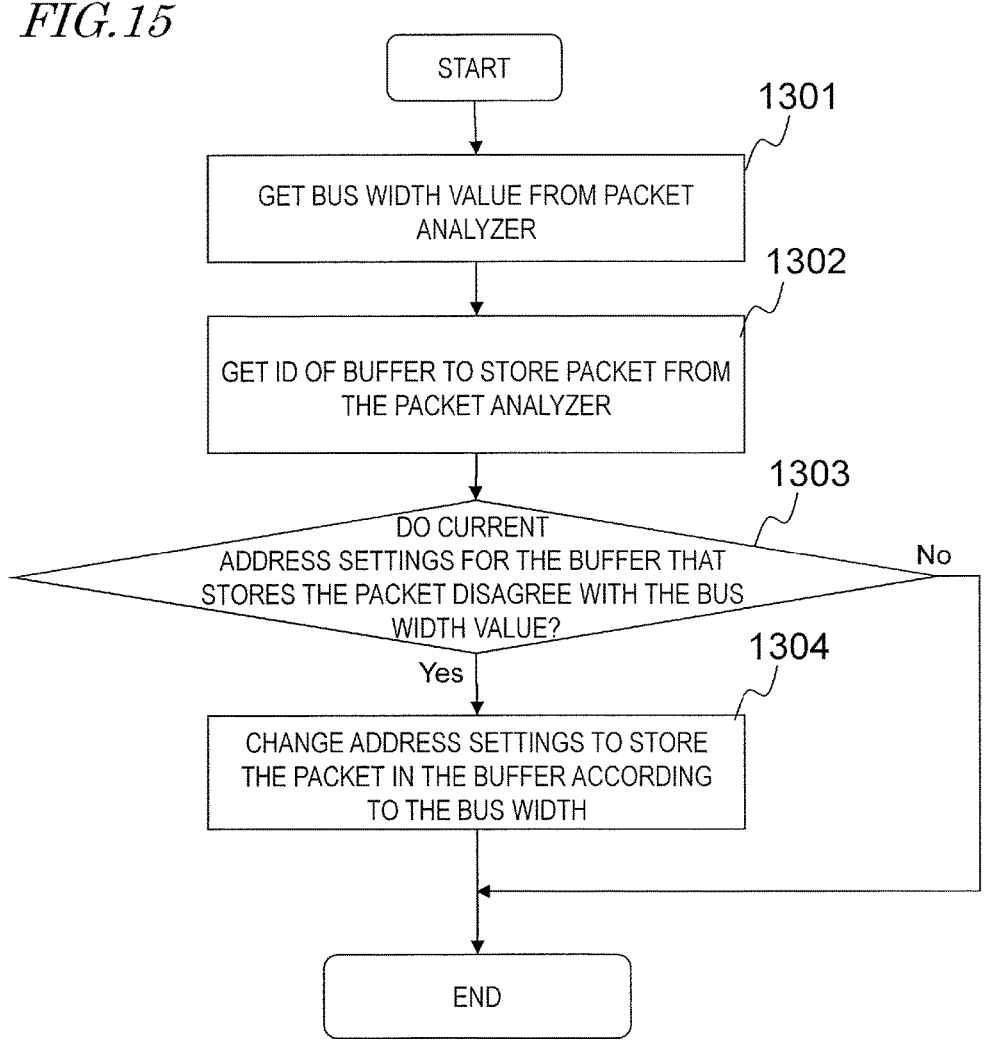
FIG. 15 shows the procedure in which the packet storage controller 413 operates.

FIG. 15 shows the procedure in which the packet storage controller 413 operates.

The packet storage controller 413 performs the following processing steps 1301 to 1303 to carry out addressing by reference to the bus width value written on the header flit in order to store the received flit in an appropriate buffer 412 and to transmit it from the buffer 412.

First, in Step 1301, the packet storage controller 413 gets the bus width value written on the header flit from the packet analyzer 411.

Next, in Step 1302, the packet storage controller 413 gets information to identify the buffer 412 that stores the flit received (i.e., a buffer ID).

Subsequently, in Step 1303, the packet storage controller 413 makes reference to the current address settings with the bus width value gotten in Step 1301 and the buffer ID gotten in Step 1302 in order to store the received flit in the appropriate buffer 412 and to transmit the flit from the buffer 412. Then, the packet storage controller 413 determines whether or not the current address settings adopted for the buffer that stores the received flit agrees with the bus width value. If the answer is NO, the process advances to Step 1304. On the other hand, if the answer is YES, the process ends. It should be noted that when the operation is started, predefined address settings are used as the "current address settings".

In Step 1304, the packet storage controller 413 changes the address settings according to the bus width value of the received flit in order to store the received flit in the buffer 412 and to transmit the flit from the buffer 412.

By performing these processing steps 1301 through 1304 in this manner, the packet storage controller 413 changes the address settings according to the bus width value written on the header flit in order to store the received flit in a buffer 412 and to transmit the flit from the buffer 412.

Figure 16A:
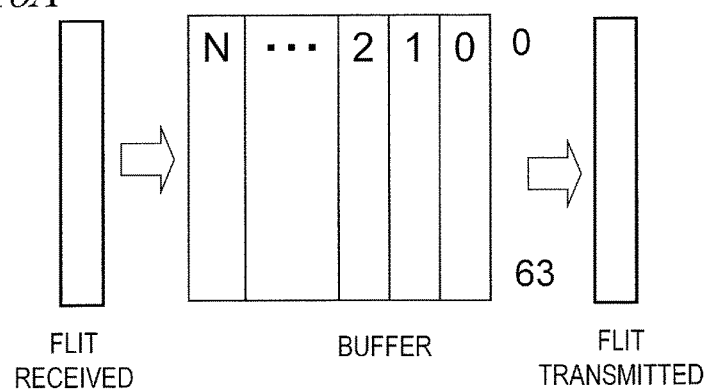
FIGS. 16A and 16B show exemplary address settings to be adopted when a received flit is stored in a buffer 412 and when the flit is transmitted from the buffer 412.
Figure 16B:
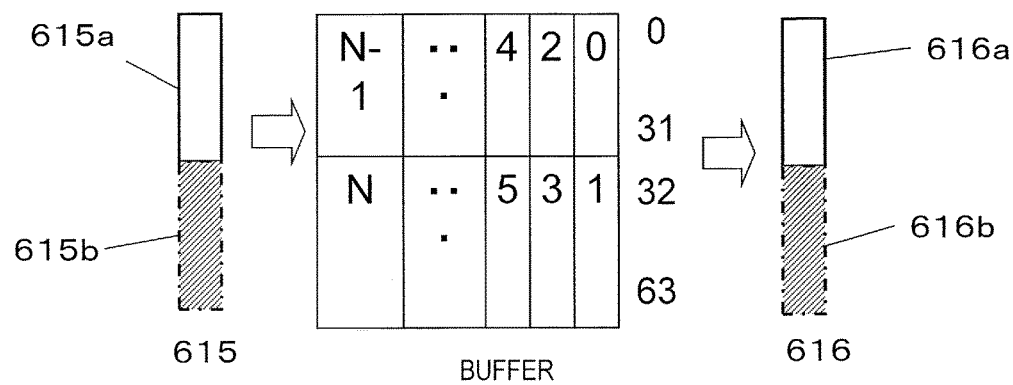

FIGS. 16A and 16B shows exemplary address settings to be adopted when the received flit is stored in the buffer 412 and when the flit is transmitted from the buffer 412.

FIG. 16A shows exemplary address settings to be adopted when a flit with a bus width of 64 bits needs to be stored as specified in the header information of the received packet.

If the bus width specified is 64 bits, the packet storage controller 413 allocates addresses to store flits to the buffer 412 on a 64 bit basis. The packet storage controller 413 stores the received flit as it is. On the other hand, when the flit needs to be transmitted from the buffer 412, the packet storage controller 413 retrieves the flit with a size of 64 bits from the buffer and transmits it as it is via the output controller 417.

FIG. 16B shows exemplary address settings to be adopted when a flit with a bus width of 32 bits needs to be stored as specified in the header information of the received packet.

If the bus width specified is 32 bits, addresses are allocated to the buffer 412 so that flits are stored there on a 32 bit basis. The packet storage controller 413 stores only the actual data 615a of the received flit 615 in the buffer 412 with the dummy data 615a removed.

On the other hand, when the flit needs to be transmitted from the buffer 412, the packet storage controller 413 retrieves the flit with a size of 32 bits (i.e., the data 615a) from the buffer, and adds dummy data 616b of 32 bits to it. As a result, the output controller 417 on the next stage can transmit it as a packet 616 with an access size of 64 bits.

In this manner, the packet storage controller 413 changes the addressing methods by reference to the bus width information that has been written on the received flit to store the flit in the buffer 412 and to transmit the flit from the buffer. As a result, the buffer 412 can be used much more efficiently.

Even though exemplary address settings when the bus width is 32 bits and when the bus width is 64 bits are shown in FIGS. 16A and 16B, the bus width does not have to be the ones shown in FIGS. 16A and 16B but may also be 16 bits, 256 bits or any other suitable value.

Also, in the example shown in FIGS. 16A and 16B, the addresses are supposed to be allocated to the buffer 412 from its beginning. However, if there are multiple packets (or flits) with mutually different bus widths in a single buffer, then addresses of 32 bits and addresses of 64 bits may be both allocated to the same buffer 412. For example, if one flit of 32 bits and one flit of 64 bits can be stored in the same buffer, then an address of 32 bits may be allocated to the first one flit from the beginning of the buffer and then an address of 64 bits may be allocated to the rest of the buffer.

FIG. 17 shows the procedure in which the routing controller 414 operates.

By reference to the destination address information of the packet, the routing controller 414 determines to what router 403 (or the bus I/F 404 on the bus slave (405) end shown in FIG. 4) the packet received by the router 403 should be transmitted (i.e., what the target router 403 is) and what buffer should store the packet in that router 403 (or the bus I/F 404 on the bus slave (405) end shown in FIG. 4). For that purpose, the routing controller 414 performs the following processing steps 1501 and 1502.

First, in Step 1501, the routing controller 414 determines, by reference to the destination address information, the target to which the packet should be transmitted next.

The target to which the packet should be output may be determined by providing a routing table defining the relation between the destination address and the output of the router 403 and by selecting an output according to the destination address value of the packet, for example. Instead of using such a routing table, any other method may also be adopted as long as the output can be determined uniquely with respect to the destination address.

Next, in Step 1502, the routing controller 414 finds what buffers 412 are available from the target router 403 (see FIG. 6) that has been selected in Step 1501 or the bus I/F 404 and chooses one of those candidate buffers as a buffer to store the packet.

By performing these processing steps 1501 and 1502, the routing controller 414 determines, by reference to the destination address information of the packet, to what router 403 (or the bus I/F 404 on the bus slave (405) end) the received packet should be transmitted next and what buffer should store the packet in that router 403.

Next, the switch allocator 415 shown in FIG. 6 will be described with reference to FIG. 18.

Figure 18:
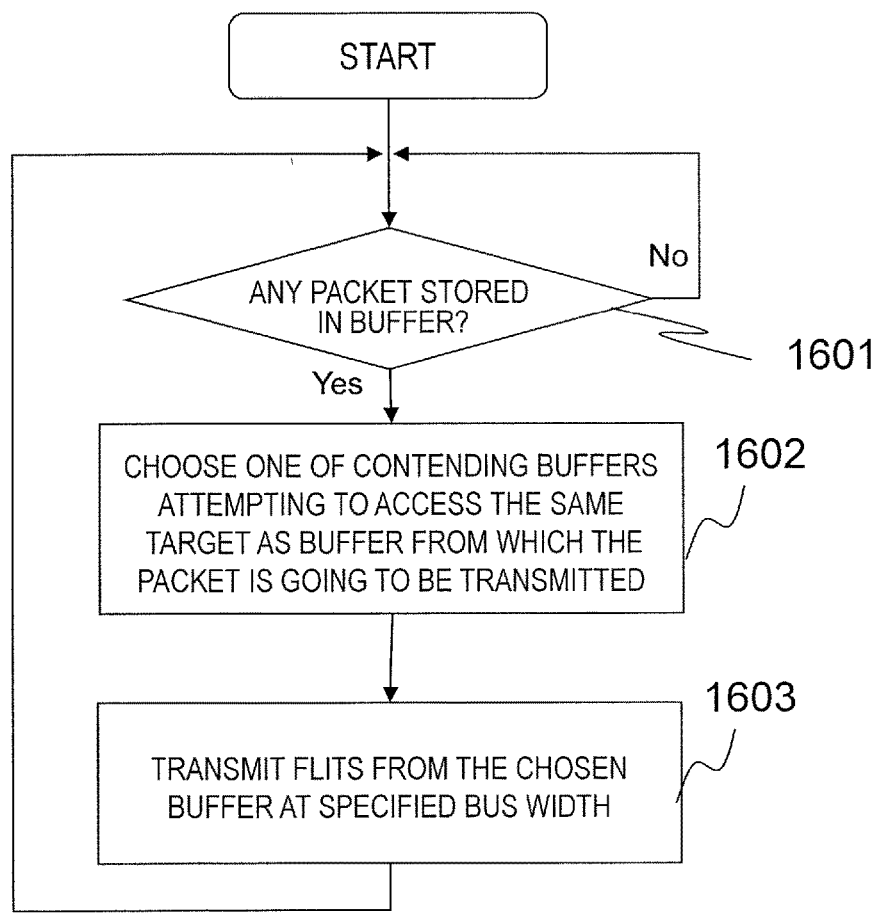
FIG. 18 shows the procedure in which the switch allocator 415 operates.

FIG. 18 shows the procedure in which the switch allocator 415 operates.

To transmit the flits that are stored in the buffer 412, the switch allocator 415 performs the following series of processing steps 1601 to 1603 over and over again.

First, in Step 1601, the switch allocator 415 determines whether or not any flit is stored in the buffer 412. If the answer is NO, this processing step 1601 is carried out all over again. On the other hand, if the answer is YES, the process advances to Step 1602.

In Step 1602, if it has turned out that there is contention between multiple buffers for the same access target, then the switch allocator 415 chooses one of those contending buffers as the buffer from which the flit is going to be transmitted.

Next, in Step 1603, the switch allocator 416 transmits the flits from the chosen buffer in accordance with the result of addressing that has been carried out on a buffer-by-buffer basis.

By performing this series of processing steps 1601 to 1603 a number of times, the switch allocator 415 transmits the flits that are stored in the buffer 412.

As described above, the router 403 of the present disclosure can sense the bus width on the bus master (401) end by reference to the information added to the packet, and can carry out appropriate addressing automatically by reference to the bus width in order to store the packet in an appropriate buffer and to transmit the packet from that buffer. As a result, the buffer 412 can be used more efficiently. Consequently, there is no need to make settings for each individual router any longer and the design of the semiconductor integrated circuit can be simplified.

In the embodiment described above, each router is supposed to sense the bus width on the bus master (401) end by reference to the bus width information added to each individual packet, and to carry out addressing by reference to the bus width information in order to store the packet in an appropriate buffer and to transmit the packet from that buffer. However, if the targets of multiple flits that are stored at the same address in the buffer are the same router, the packet storage controller 413 may transmit those flits that are stored at the same address in the buffer to the next router as they are without separating those flits.

For instance, in the example illustrated in FIG. 16B, two flits, each having a bus width of 32 bits, are stored in the buffer with no extra space left between them. In this case, if the destinations of these two flits that are stored at the same address with no space left between them are the same router, then both of these two flits may be transmitted simultaneously through a bus with a bus width of 64 bits without separating them from each other. As a result, the transmission delay can be cut down because two flits can be transmitted at a time.

It should be noted that the packet storage controller 413 can determine, by comparing the destination addresses which are written in the header information that has been gotten by the packet analyzer 411, whether or not the flits that are stored at the same address have the same destination.

Also, in the embodiment described above, the bus width is supposed to be constant from the bus master through the slave. However, this is only an example. In another example, in a situation where buses with multiple different bus widths are connected together via routers and where data is going to be transmitted through a bus with a narrow bus width and then through a bus with a broad bus width, if the targets of a plurality of flits that are stored at consecutive addresses in the buffer are the same router, then the packet storage controller 413 may transmit those flits that are stored at the consecutive addresses collectively as a single piece of data adaptively to the broader bus width of the target.

For instance, suppose in the examples shown in FIGS. 16(A) and 16(B), the target is connected to a bus with a bus width of 128 bits and the destinations of flits which are stored at consecutive addresses in the buffer are the same router. In that case, two sets of 32- or 64-bit data which are stored at two consecutive addresses may be combined into a single set of 128-bit data and the combined data may be transmitted through a bus with a bus width of 128 bits. As a result, the transmission delay can be cut down because two flits stored at two consecutive addresses can be transmitted collectively at a time.

It should be noted that the packet storage controller 413 can determine, by comparing the destination addresses which are written in the header information that has been gotten by the packet analyzer 411, whether or not the flits that are stored at the consecutive addresses have the same destination. Also, it has been written in advance in the packet storage controller 413 on a router basis whether the bus connected to the target of a router is a local bus or a backbone bus.

Also, in the embodiment described above, in order to connect a bus master with a bus width of 32 bits and a bus master with a bus width of 64 bits together, dummy data of 32 bits is supposed to be added to the data of 32 bits so that every piece of data transmitted has a size of 64 bits. However, this is just an example. As another example, suppose a bus system in which a bus master with a bus width of 32 bits and a bus master with a bus width of 256 bits are connected together. If the same method were applied to this situation, then the size of dummy data to be added to make the size of every bus 256 bits would be as much as 224 bits. That is to say, the dummy data would account for a larger percentage of the data transmitted. In that case, the effect of the embodiment described above would be achieved remarkably. In other words, it can be said that the greater the difference in bus width between multiple bus masters, the more significantly the buffer use efficiency would be increased according to this embodiment.

In addition, according to the present disclosure, if a lot of packets need to be stored in a single buffer 412, the buffer use efficiency should be increased. That is why a significant effect would be achieved in a situation where a packet of a small size is going to be transmitted (e.g., when a read request command needs to be transmitted from a bus master to a shared memory).

Furthermore, in the embodiment described above, data is transmitted from the bus master 401 to the bus I/F 402 on the supposition that the bus width does not change. However, the bus I/F 402 and the router 403 of the present disclosure can also cope with a situation where the bus width changes dynamically while data is transmitted from the bus master 401 to a bus I/F.

For example, in the bus system shown in FIG. 4, the bus width of data to be transmitted from the bus master 401 to the bus I/F 402 changes if the processor has switched the modes of operation between a normal mode and a power saving mode which would consume mutually different quantities of power. More specifically, if the processor that has been operating in the normal mode has switched its modes of operation into the power saving mode, the bus width of an internal bus in the processor is changed dynamically and the power that has been supplied to the bus not used is stopped, thereby cutting down the power consumption. The bus I/F 402 is notified of such a change in the bus width used by the bus master 401 as a part of a control signal. Likewise, when the modes of operation are switched from the power saving mode into the normal mode, the bus width is also changed in the same way.

Figure 19:
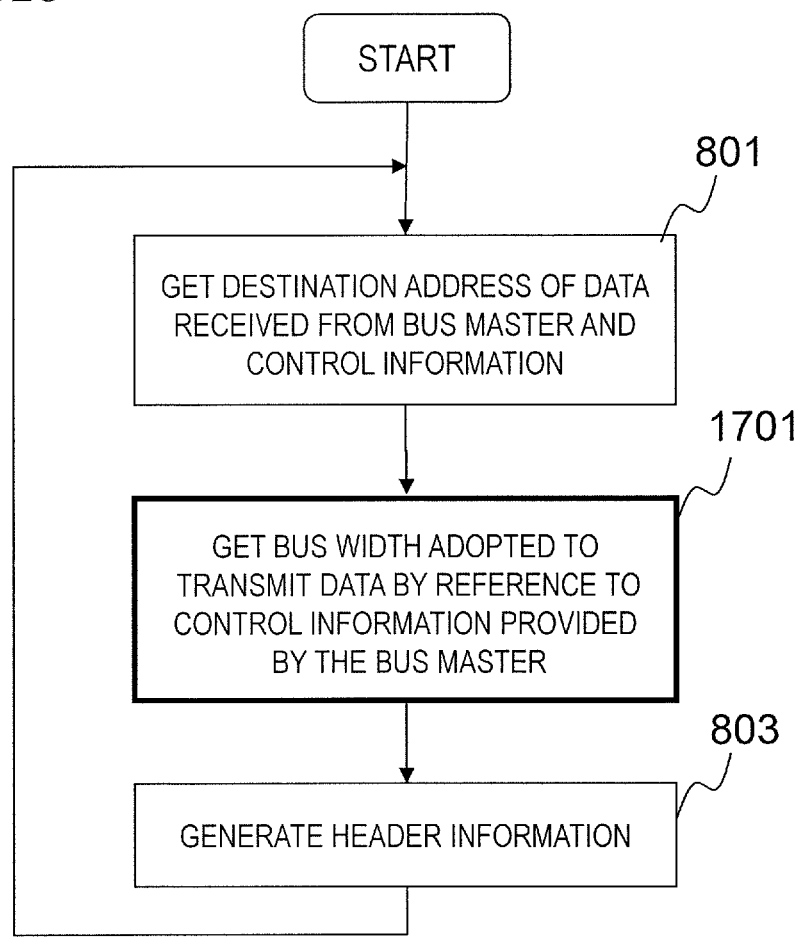
FIG. 19 shows the procedure in which the bus I/F 402 operates in a situation where the bus width changes dynamically while the bus master 401 is transmitting data.

FIG. 19 shows the procedure in which the bus I/F 402 operates in a situation where the bus width changes dynamically while the bus master 401 is transmitting data.

In FIG. 19, the same processing step as its counterpart shown in FIG. 11 is identified by the same reference numeral as the one used there, and description thereof will be omitted herein.

In Step 1701, the header information generator 408 of the bus I/F 402 gets bus width information by reference to the control information that has been provided by the bus master 401. Even if the bus width is changed dynamically, the bus width information at that point in time is obtained from the control information every time the bus width is changed. By performing the processing steps shown in FIG. 19, the bus I/F 402 can change the bus width value written in the header information as the bus width set by the bus master 401 changes.

In the flowchart shown in FIG. 19, the bus width value of the data being transmitted is supposed to be provided by the bus master 401 as a part of the control information. Alternatively, a bus width for the power saving mode and a bus width for a normal mode may be stored in advance in the storage 407 and a signal indicating whether the mode of operation is the power saving mode or the normal mode may be received as a part of the control signal from the bus master 401. The bus width may be determined in this manner, too.

The bus width of data being transmitted from the bus master 401 changes not only when the modes of operation are changed into the power saving mode but also when the modes of operation of the bus master 401 are changed from narrow transfer processing into normal transfer processing, and vice versa. The narrow transfer is a function which may be used in a bus protocol such as AXI (Advanced eXtensible Interface). For example, if the bus master 401 is attempting to communicate with a bus slave 405 with a smaller bus width (e.g., 8 bits or 16 bits) than its own bus width (e.g., 32 bits) or if the bus slave 405 is a memory and is trying to access only a part of one word (e.g., 8 bits), the narrow transfer is used to transfer data using only a part of a data line.

The bus width value for use to make such a narrow transfer is provided by the bus master 401 as a part of a control signal for the bus I/F 402. Thus, the bus I/F 402 can change the bus width value to be written in the header information according to the bus width value provided by the bus master 401.

As can be seen, even in those modes other than the power saving mode, the bus width value to be written in the header information may also be changed according to the bus width value provided by the bus master 401.

Optionally, the header information 900 may include not only those pieces of information about the destination address and bus width but also other pieces of additional information as well. For example, the header information 900 may include class information representing how strictly the quality should be controlled on a packet-by-packet basis in order to ensure the required quality for the router 403 and information about the deadline time that is a maximum permissible time delay for the required quality.

If the header information includes those pieces of information about the class and the deadline time, for example, then the router 403 may change the address settings to store the received flit in the buffer and to transmit it from the buffer by reference to not only the bus width value but also those pieces of additional information about the class and the deadline time.

Figure 20:
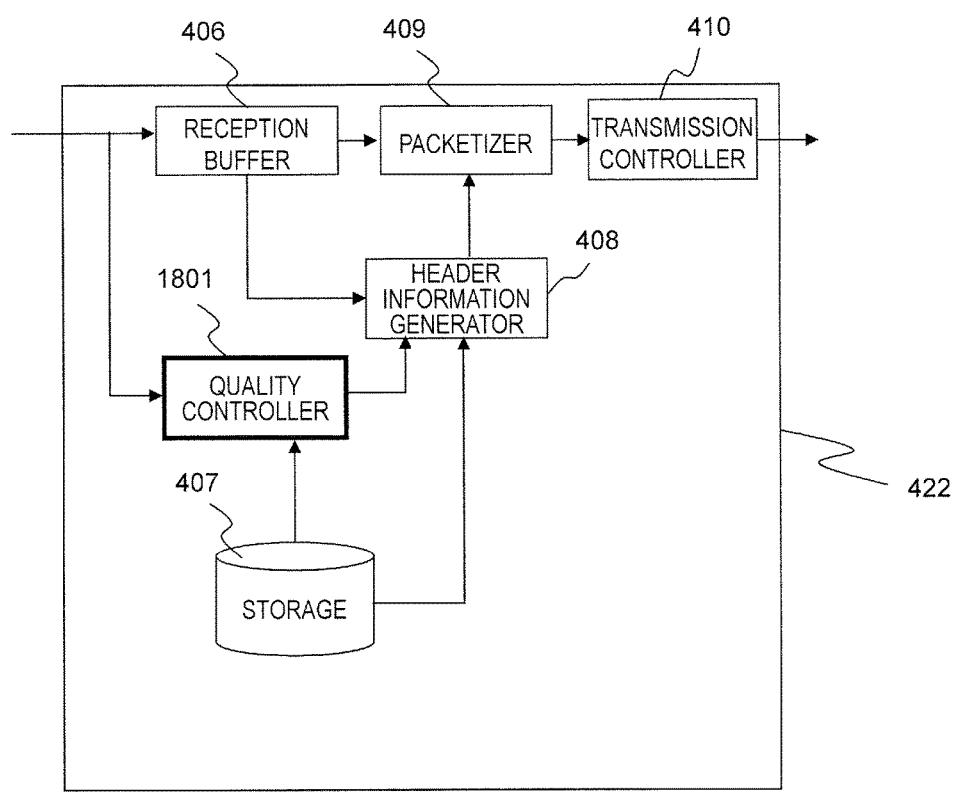
FIG. 20 illustrates a configuration for a bus I/F 422 which writes not only the bus width value but also information about the class and the deadline time on the header information.

FIG. 20 illustrates a configuration for a bus I/F 422 which writes not only the bus width value but also information about the class and the deadline time on the header information. In FIG. 20, any component also included in the bus I/F 402 shown in FIG. 5 and having substantially the same function as its counterpart is identified by the same reference numeral and description thereof will be omitted herein.

The bus I/F 422 includes a quality controller 1801.

The quality controller 1801 is a circuit for determining the class representing how strictly the quality of the packet to be transmitted by the bus master 401 should be controlled to ensure the required quality and the deadline time that is the maximum permissible time delay to satisfy the quality requirement.

The class and deadline time value are provided directly by the bus master 401 for the quality controller 1801. Alternatively, the class value of the bus master 401 may be stored in advance in the storage 407 and may be determined by reference to the storage 407. In addition, a maximum permissible time delay to satisfy the quality requirement may be stored in advance in the storage 407 and the deadline time may be determined by adding the maximum permissible time delay to satisfy the quality requirement to the time when data is transmitted from the bus master 401 to the reception buffer 406.

The header information generator 408 generates packet header information including not only the target address and bus width but also information about the class and deadline time that have been determined by the quality controller 1801.

Figure 21:
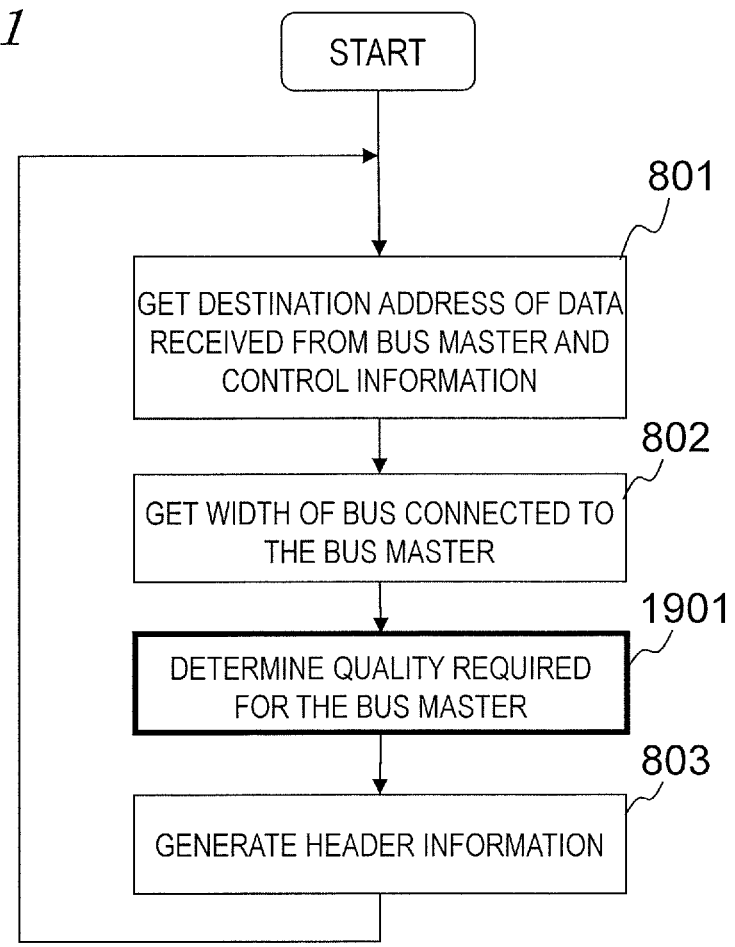
FIG. 21 shows the procedure of operation of the bus I/F 422 that writes the class of the required quality and the deadline time.

FIG. 21 shows the procedure of operation of the bus I/F 422 that writes the class of the required quality and the deadline time.

In FIG. 21, the same processing step as its counterpart shown in FIG. 11 is identified by the same reference numeral as the one used there, and description thereof will be omitted herein.

After the bus width value of the bus connected to the bus master has been obtained in Step 802, the quality controller 1801 determines the quality required for the bus master in Step 1901. And then the process advances to Step 803.

As can be seen, by using the configuration shown in FIG. 20 and following the flowchart shown in FIG. 21, the bus I/F 402 generates and transmits a packet including information about the packet's class and deadline time.

Figure 22:
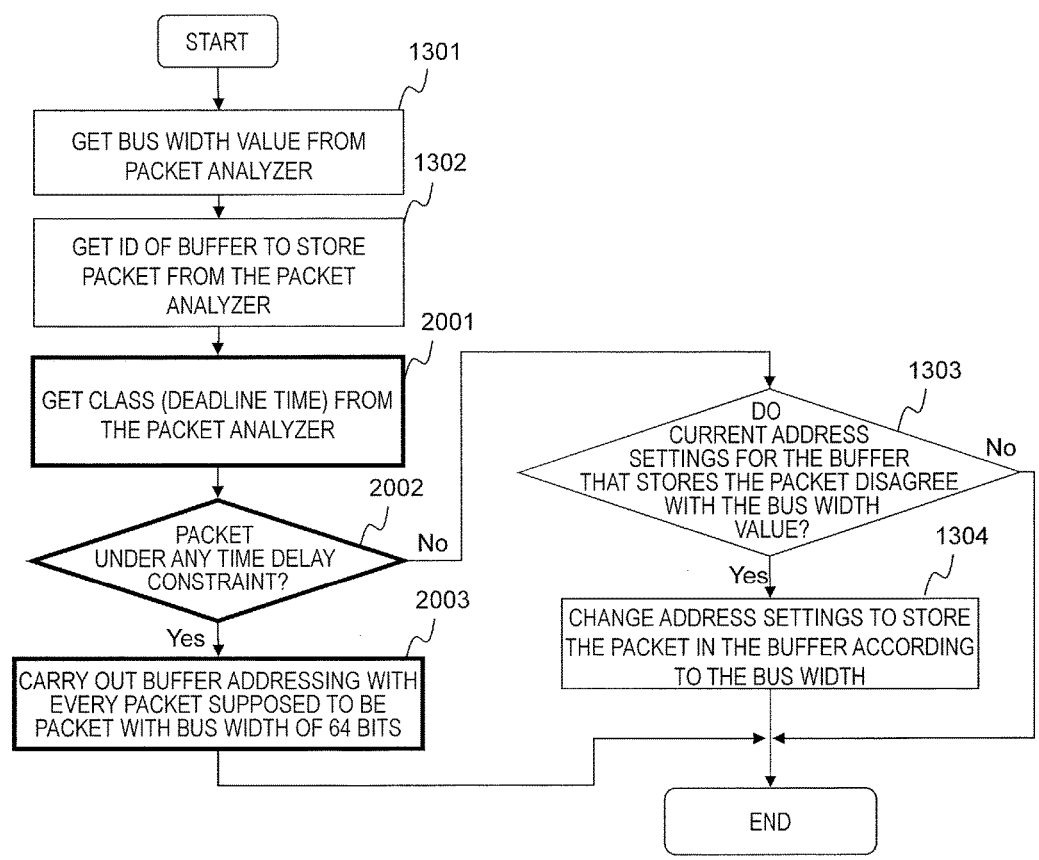
FIG. 22 shows the procedure of operation of the router's (403) packet storage controller 413 (see FIG. 6) which carries out addressing by reference to not only the bus width but also information about the packet's class and deadline time in order to store a received flit in an appropriate buffer and transmit it from the buffer.

FIG. 22 shows the procedure of operation of the router's (403) packet storage controller 413 (see FIG. 6) which carries out addressing by reference to not only the bus width but also information about the packet's class and deadline time in order to store a received flit in an appropriate buffer and transmit it from the buffer. In FIG. 22, the same processing step as its counterpart shown in FIG. 15 is identified by the same reference numeral as the one used there, and description thereof will be omitted herein.

In Step 2001, the packet storage controller 413 gets the class and deadline time that are written on the header information from the packet analyzer 411, and then the process advances to Step 2002.

In Step 2002, the packet storage controller 413 determines, by reference to the class and deadline time that are written in the packet received, whether or not this is a packet on which a time delay constraint is imposed. If the answer is YES, the process advances to Step 2003. Otherwise, the process advances to Step 1303.

In Step 2003, the packet storage controller 413 carries out buffer addressing on the supposition that every packet under the time delay constraint is a packet with a bus width of 64 bits, irrespective of its actual bus width value written on the header information.

By performing these processing steps shown in FIG. 22 in this manner, the packet storage controller 413 carries out addressing by reference to not only the bus width but also information about the packet's class and deadline time in order to store a received flit in an appropriate buffer and transmit it from the buffer.

For example, if the same router 403 has both a packet which belongs to a class with a time delay (deadline time) constraint (such as the ones used for phone conversation) and a packet which belongs to a class without the time delay (deadline time) constraint and which should be processed by making best efforts (such as the ones used in GPS processing), then packets belonging to those respective classes may be stored separately in multiple buffers 412 independently of each other and the packets for phone conversation may be transmitted preferentially. In this manner, good quality can be ensured for phone conversation.

If there are multiple groups of packets under mutually different levels of time delay constraint in the same mix, a higher priority should be given to storing and transmitting the flits to the next node as soon as possible rather than increasing the buffer use efficiency as for packets under a strict time delay constraint. That is why those packets under the time delay (deadline time) constraint are processed by always storing and transmitting them at a bus width of 64 bits without carrying out addressing according to the bus width.

As a result, it is possible to avoid an unwanted situation where by giving a higher priority to increasing the buffer use efficiency, a packet is stored over multiple addresses in the same buffer to increase the time delay to be caused in storing and retrieving flits as in the example shown in FIG. 3.

On the other hand, as for the packets under no time delay constraint, addressing may be carried out according to the bus width in order to give a higher priority to using the buffer 412 more efficiently.

In the example described above, the addressing methods are supposed to be changed according to the class to which a given packet belongs. However, the addressing methods may also be changed according to the amount of time left until the deadline, for example.

By carrying out addressing for the buffer 412 by reference to not only the bus width written on the header information but also the packet's class and deadline time as well, the buffer 412 can be used more efficiently with each packet's required quality taken into consideration.

Also, if multiple buffers 412 are provided for the router 403, the routing controller 414 may select a buffer to store a flit at the target router 403 according to the bus width that has been gotten by the packet analyzer 411 and the availability of buffers at the target. In this case, the "target" may be either an adjacent router or a bus I/F 404 on the bus slave (405) end.

For example, the availability of buffers at the target may be determined by examining how flits are stored in the buffers. Specifically, suppose there are two buffers (which will be referred to herein as "Buffer A" and "Buffer B", respectively) with an access width of 64 bits at the target router, Buffer A is vacant, but Buffer B stores a flit of 32 bits.

In such a situation, if the packet on the verge of being transmitted turns out to be a flit of 32 bits, the routing controller 414 chooses Buffer B as the target storage in order to use the target buffer more efficiently.

On the other hand, if the packet on the verge of being transmitted turns out to be a flit of 64 bits and if Buffer B is chosen as the target storage of the flit, then the flit will be stored separately at multiple different addresses in the buffer as in Packet #2 shown in FIG. 3. That is why to prevent the flit from being stored separately, the routing controller 414 chooses Buffer A as the target storage. Optionally, the availability of buffers does not have to be how the flit is stored in the buffer but may also be how much space is left in the buffer or in what part of the buffer the space is left.

Furthermore, in choosing a buffer to use at the target, the availability of buffers at the target may also be the type of the bus width of the flit that is stored in the target buffer. Specifically, suppose there are two buffers (which will be referred to herein as "Buffer A" and "Buffer B", respectively) with an access width of 64 bits at the target router, Buffer A stores only a flit of 32 bits, and Buffer B stores only a flit of 64 bits.

In such a situation, if the packet on the verge of being transmitted turns out to be a flit of 32 bits, the routing controller 414 chooses Buffer A that stores only a flit of 32 bits as the target buffer. On the other hand, if the packet on the verge of being transmitted turns out to be a flit of 64 bits, the routing controller 414 chooses Buffer B that stores only a flit of 64 bits as the target buffer. By storing flits of the same size collectively in the same buffer in this manner, those flits can be stored and retrieved more easily, and the buffer use efficiency can be increased more significantly, than in a situation where a mix of flits of various sizes are stored in the same buffer.

By having the routing controller 414 choose a buffer to store the flit at the target router by reference to the bus width of the flit on the verge of being transmitted and the availability of buffers at the target in this manner, the target buffer can be used even more efficiently.

It should be noted that the routing controller 414 manages the availability of buffers at the target router using a control signal 604 on the NoC end.

In the example described above, either a buffer to store a flit with a bus width of 32 bits or a buffer to store a flit with a bus width of 64 bits is supposed to be chosen as the buffer to store a flit at the target router. However, this method is also applicable to flits with various other sizes such as 8 bits or 256 bits. Also, three or more different kinds of flits may be stored there, too.

In the foregoing description, it has been described as just an example how to transmit data from the bus master 401 shown in FIG. 4 as the transmission node along the forward route. However, as for the backward route on which the bus slave 405 becomes the transmission node, if the bus I/F 404 on the bus slave (405) end has the same configuration as the bus I/F 402 on the bus master (401) end and if the data that has been transmitted from the bus slave 405 is transformed into a packet including the bus width value of the bus between the bus slave 405 and the bus I/F 404 and transmitted to the router 403, the buffer provided in the router can also be used as efficiently as on the forward route.

In the foregoing description, multiple bus masters (and bus I/Fs) with mutually different bus widths are supposed to be connected together through a system bus with the same bus width as shown in FIGS. 1 to 3. However, the present disclosure does not have to be applied to such a situation where the entire system has the same bus width. Rather the present disclosure is also applicable to a bus system in which a system bus and local buses are connected together via routers (or gateways) and in which the system bus has a different bus width from the local buses.

Figure 23:
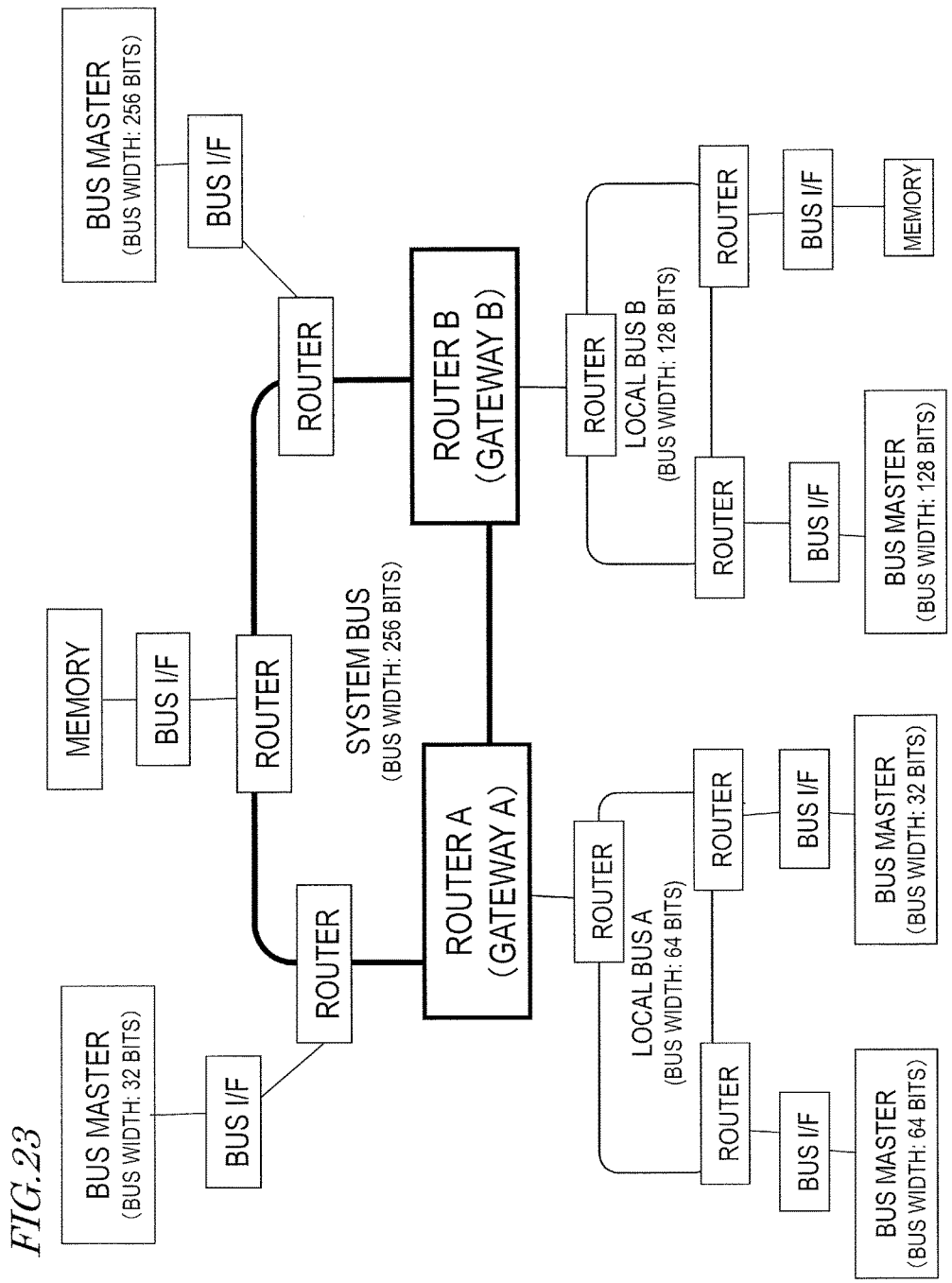
FIG. 23 illustrates an exemplary bus system including multiple buses with mutually different bus widths.

FIG. 23 illustrates an exemplary bus system including multiple buses with mutually different bus widths.

In FIG. 23, Local Bus A with a bus width of 32 bits and a system bus with a bus width of 256 bits are connected together via Router A (Gateway A), and Local Bus B with a bus width of 128 bits and the system bus are connected together via Router B (Gateway B). In the example shown in FIG. 2, the bus widths are 32 bits and 256 bits between a bus master and a bus I/F and the bus I/F is connected to a router on the system bus. However, in FIG. 23, such a configuration is extended to an arrangement in which there is a network (of local buses) between the bus I/F and the system bus.

In the example illustrated in FIG. 23, Router A receives a packet of data which a bus master (bus I/F) with a bus width of 64 bits has transmitted through Local Bus A and then transmits the packet to the system bus with a bus width of 256 bits. In this case, Router A operates in the same way as the routers 205 and 206 shown in FIG. 3. Meanwhile, Router B receives a packet of data which a bus master (bus I/F) with a bus width of 128 bits has transmitted through Local Bus B and then transmits the packet to the system bus with a bus width of 256 bits. In this case, Router B also operates in the same way as the routers 205 and 206 shown in FIG. 3. As a result, these routers which form parts of the system bus can use the buffers more efficiently.

A router according to an embodiment of the present disclosure can contribute to using the buffer of the router more efficiently in an integrated circuit with distributed buses. That is why if multiple media processing DSPs which use multiple different bus widths and a CPU to transfer a file at high speeds are integrated together on a single SoC (System on Chip) through the distributed buses, the router contributes effectively to saving the resources that should be used to realize this implementation and yet getting the processing done with the time delay cut down at the same time.

While the present invention has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the invention that fall within the true spirit and scope of the invention.

What is claimed is:

1. A bus system in which a plurality of bus interface apparatuses and routers are connected together through packet exchange buses which have been established on an integrated circuit,
wherein the plurality of bus interface apparatuses are respectively connected to a plurality of transmission nodes which simultaneously transmit data of mutually different numbers of bits in one cycle of operation of the bus system,
each of the plurality of bus interface apparatuses comprises:
a reception buffer which stores data that has been received from a transmission node connected to itself;
a storage which stores size information indicating the number of bits as to the connected transmission node;
a header information generator which generates header information including the size information;
a packetizer which generates a packet based on the header information and the data; and
a transmission controller which controls transmission of the packet to the router, and
the router includes:
a packet analyzer which analyzes the packet that has been received from the bus interface apparatus and which gets the size information by reference to the header information;
a buffer which stores the packet that has been received;
a routing controller which determines the target of the packet received;
an output controller which controls transmission of the packet from the buffer; and
a packet storage controller which determines how to allocate a space in the buffer for storage by reference to the gotten size information.

2. The bus system of claim 1, wherein the packet storage controller of the router allocates an address in the buffer to the packet using the number of bits indicated by the size information as a unit, and
the buffer stores the received packet at the address that has been allocated by the packet storage controller.

3. The bus system of claim 2, wherein the plurality of transmission nodes include a first transmission node which transmits data at a first number of bits and a second transmission node which transmits data at a second number of bits that is smaller than the first number of bits, and if the data is transmitted through the bus at a third number of bits that is equal to or greater than the first and second numbers of bits,
the transmission controller of the bus interface apparatus that is connected to the second transmission node transmits the packet to the router at the third number of bits including the data at the second number of bits,
the packet storage controller of the router allocates the address in the buffer by using, as a unit, the second number of bits indicated by the size information, and
the buffer of the router stores the packet at the second number of bits.

4. The bus system of claim 1, wherein the packet storage controller of the router further controls the size of the packet to be transmitted from the buffer by reference to the size information gotten.

5. The bus system of claim 1, wherein the size information is changeable, and
if the size information indicating the number of bits has changed with respect to a predetermined transmission node, the header information generator of the bus interface apparatus that is connected to the predetermined transmission node changes the size information included in the header information.

6. The bus system of claim 5, wherein the predetermined transmission node has multiple modes of operation in which power is consumed to mutually different degrees, and
the size information indicating the number of bits changes in response to a change of the modes of operation.

7. The bus system of claim 5, wherein the predetermined transmission node is switchable from a data transfer mode in which data is transferred at a first number of bits into a data transfer mode in which data is transferred at a second number of bits that is smaller than a first bus width, and vice versa, and
the size information indicating the number of bits changes in response to a switch of the data transfer modes.

8. The bus system of claim 1, wherein the bus interface apparatus further includes a quality controller which determines the quality required for the transmission node connected,
- the header information generator of the bus interface apparatus generates header information further including information about required quality,
- the packet analyzer of the router gets the size information and the information about the required quality that have been written on the header information in the packet received, and
- the packet storage controller of the router determines how to allocate a space in the buffer for storage by reference to the size information and the required quality.

9. The bus system of claim 4, wherein the bus interface apparatus further includes a quality controller which determines the quality required for the transmission node connected,
- the header information generator of the bus interface apparatus generates header information further including information about required quality,
- the packet analyzer of the router gets the size information and the information about the required quality that have been written on the header information in the packet received, and
- the packet storage controller of the router determines how to allocate a space in the buffer for storage by reference to the size information and the required quality.

10. The bus system of claim 8, wherein the quality controller gets information indicating the quality required for the transmission node connected from that transmission node, and
- if the required quality indicates that there is no constraint on time delay,
- the packet storage controller of the router determines, on a packet-by-packet basis, how to allocate a space in the buffer for storage by reference to the size information included in the header information.

11. The bus system of claim 9, wherein the quality controller gets information indicating the quality required for the transmission node connected from that transmission node, and
- if the required quality indicates that there is no constraint on time delay,
- the packet storage controller of the router determines, on a packet-by-packet basis, how to allocate a space in the buffer for storage by reference to the size information included in the header information.

12. The bus system of claim 8, wherein the quality controller gets information indicating the quality required for the transmission node connected from that transmission node, and
- if the required quality indicates that a constraint on time delay is stricter than a predetermined level,
- the packet storage controller of the router determines how to allocate a space in the buffer for storage and how to access the space for transmission based on a predetermined constant number of bits.

13. The bus system of claim 9, wherein the quality controller gets information indicating the quality required for the transmission node connected from that transmission node, and
- if the required quality indicates that a constraint on time delay is stricter than a predetermined level,
- the packet storage controller of the router determines how to allocate a space in the buffer for storage and how to access the space for transmission based on a predetermined constant number of bits.

14. The bus system of claim 10, wherein the constraint on the time delay is represented by at least one of a class indicating how strictly the required quality is to be controlled and a deadline time that is a maximum permissible time delay to ensure the required quality.

15. The bus system of claim 1, wherein the header information generator of the bus interface apparatus generates the header information as router information to be used by the router and bus interface information to be used by the bus interface apparatus in this order.

16. The bus system of claim 1, wherein the routing controller of the router chooses a buffer to be used in another apparatus, which is the target of the packet, to store the received packet by reference to the size information that has been gotten by the packet analyzer and the availability of a buffer in that another apparatus.

17. The bus system of claim 16, wherein the availability of a buffer in that another apparatus which is the target of the packet is at least one of how a flit is stored in the buffer, the number of bits of the flit stored, and the space left in the buffer.

18. A bus interface apparatus to be used in a bus system, the bus system including:
- a packet exchange bus which has been established on an integrated circuit;
- a transmission node which transmits data through the bus; and
- a router which is provided on the bus to relay the data being transferred, the apparatus comprising:
- a reception buffer which is connected to the transmission node and which stores data that has been received from the transmission node;
- a storage which stores size information indicating the number of bits as to the transmission node;
- a header information generator which generates header information including the size information;
- a packetizer which generates a packet based on the header information and the data; and
- a transmission controller which controls transmission of the packet to the router.

19. The bus interface apparatus of claim 18, wherein if the bus and the router transmit data at a first number of bits in one cycle of operation and if the transmission node transmits data at a second number of bits that is different from the first number of bits,
- the header information generator generates header information including size information indicating the second number of bits which is used to determine how to allocate a space in the buffer for storage to the packet that has been received by the router.

20. A router for use in a bus system,
wherein the bus system includes:
- a packet exchange bus which has been established on an integrated circuit;
- a transmission node which transmits data through the bus; and
- a bus interface apparatus which connects the transmission node and the bus together, the bus interface apparatus generating a packet based on the data that has been received from the transmission node and header information including size information indicating the number of bits as to the transmission node and outputting the packet, and
wherein the router includes:

a packet analyzer which analyzes the packet that has been received from the bus interface apparatus and which gets the size information by reference to the header information;

a buffer which stores the packet that has been received;

a routing controller which determines the target of the packet received;

an output controller which controls transmission of the packet from the buffer; and a packet storage controller which determines how to allocate a space in the buffer for storage by reference to the size information gotten.

* * * * *